(12) United States Patent
Hirano et al.

(10) Patent No.: US 11,431,579 B2
(45) Date of Patent: Aug. 30, 2022

(54) ANOMALY DETECTION DEVICE, ANOMALY DETECTION SYSTEM, AND CONTROL METHOD

(71) Applicant: Panasonic Intellectual Property Corporation of America, Torrance, CA (US)

(72) Inventors: Ryo Hirano, Osaka (JP); Takamitsu Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 271 days.

(21) Appl. No.: 16/929,691

(22) Filed: Jul. 15, 2020

(65) Prior Publication Data

US 2020/0351168 A1 Nov. 5, 2020

Related U.S. Application Data

(63) Continuation of application No. PCT/JP2019/017023, filed on Apr. 22, 2019.

(30) Foreign Application Priority Data

May 23, 2018 (JP) .............................. JP2018-099037

(51) Int. Cl.
*H04L 41/142* (2022.01)
*H04L 12/40* (2006.01)
*H04L 67/131* (2022.01)

(52) U.S. Cl.
CPC ............ *H04L 41/142* (2013.01); *H04L 12/40* (2013.01); *H04L 67/131* (2022.05); *H04L 2012/40215* (2013.01)

(58) Field of Classification Search
None
See application file for complete search history.

(56) References Cited

U.S. PATENT DOCUMENTS

| | | | | |
|---|---|---|---|---|
| 2011/0197274 A1* | 8/2011 | Callon | ................ | H04L 63/1425 726/22 |
| 2016/0297401 A1* | 10/2016 | Haga | .................... | H04L 9/0891 |
| 2019/0116001 A1* | 4/2019 | Dropps | ................ | H04L 1/0061 |

OTHER PUBLICATIONS

International Search Report dated Jun. 11, 2019 in International (PCT) Application No. PCT/JP2019/017023.
(Continued)

*Primary Examiner* — Angela Nguyen
(74) *Attorney, Agent, or Firm* — Wenderoth, Lind & Ponack, LLP.

(57) ABSTRACT

An IDS ECU includes: an anomalous frame detector that detects an anomalous frame; a connector communicator that transmits an anomaly-related request frame to a connector that is a transmitter of the anomalous frame, to request a response from the connector, and receives, from the connector, an anomaly-related response frame generated by the connector based on the anomaly-related request frame and indicating the transmitter; a network anomaly determiner that calculates, from the anomaly-related response frame, the number of anomalous connectors indicating the number of connectors that transmitted the anomaly-related response frame, and determines that an in-vehicle network system is: in a first anomalous state when the number is 0; and in a second anomalous state when the number is not 0; and a network anomaly handler that handles the first or second anomalous state determined by the network anomaly determiner.

12 Claims, 16 Drawing Sheets

(56) References Cited

OTHER PUBLICATIONS

Kiyotaka Atsumi et al., "Smart CAN cable, Another proposal of intrusion prevention system (IPS) for in-vehicle networks", SCIS 2018, 2018 Symposium on Cryptography and Information Security, Jan. 2018.

* cited by examiner

FIG. 8

| ID OF TRANSMISSION FRAME | HASH VALUE OF TRANSMISSION FRAME | NUMBER OF TRANSMISSIONS |
|---|---|---|
| 110 | B8 C9 32 14 AD 23 33 AB | 2 |
| 120 | C1 99 56 11 D3 23 43 B3 | 1 |
| ... | ... | ... |

FIG. 9

| ID OF ANOMALOUS FRAME | HASH VALUE OF ANOMALOUS FRAME | NUMBER OF DETECTED ANOMALOUS FRAMES |
|---|---|---|
| 100 | A9 B1 43 91 6A CA 92 AA | 1 |
| 110 | B8 C9 32 14 AD 23 33 AB | 3 |
| ... | ... | ... |

FIG. 10

| ID OF ANOMALOUS FRAME | HASH VALUE OF ANOMALOUS FRAME | NUMBER OF ANOMALOUS CONNECTORS | NUMBER OF RECEIVED ANOMALY-RELATED RESPONSE FRAMES |
|---|---|---|---|
| 100 | A9 B1 43 91 6A CA 92 AA | 1 | 1 |
| 110 | B8 C9 32 14 AD 23 33 AB | 2 | 3 |
| ... | ... | ... | ... |

FIG. 11

| TIME | TOTAL NUMBER OF CONNECTORS |
|---|---|
| T1 | 41 |
| T2 | 40 |
| ... | ... |

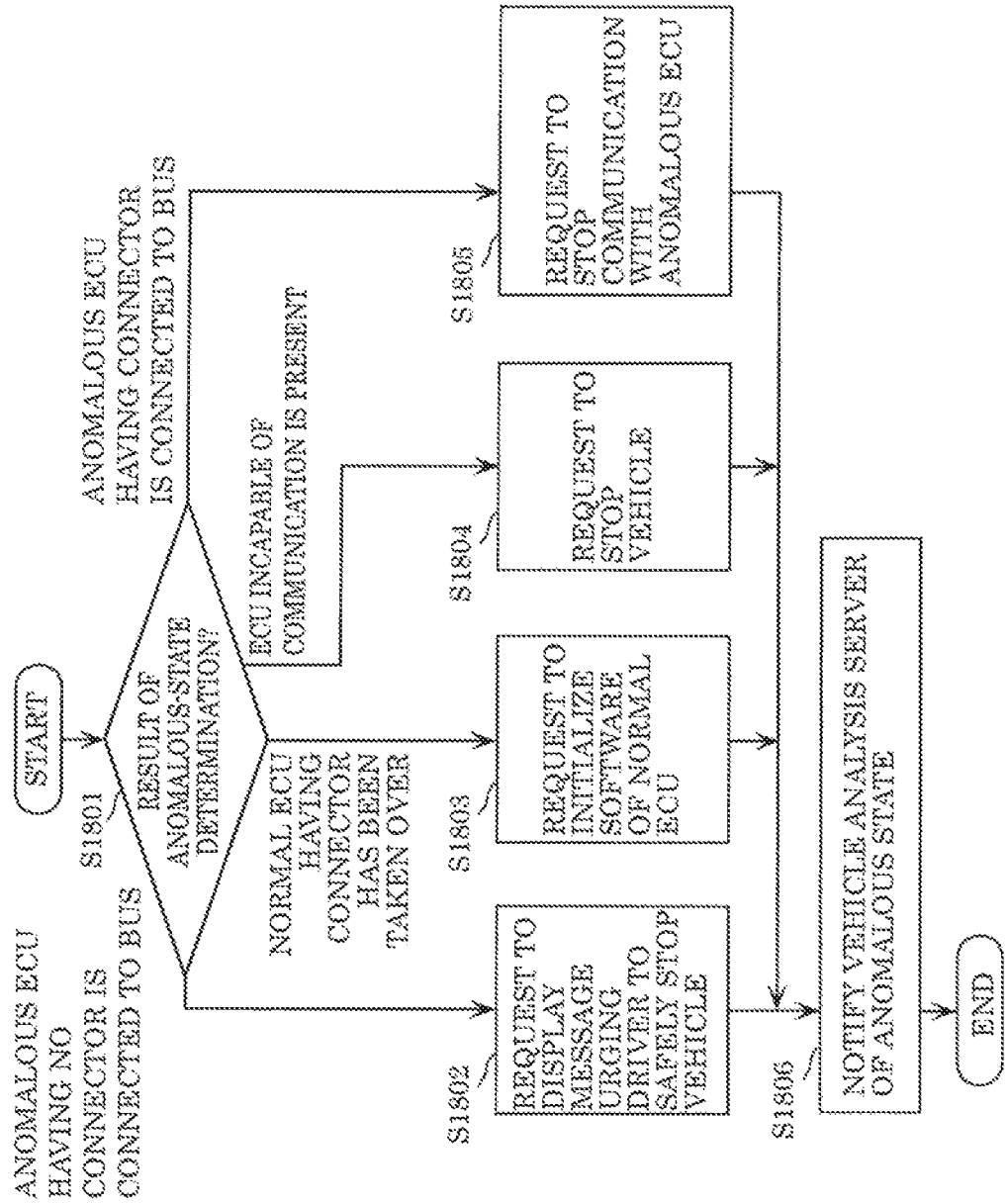

ANOMALY DETECTION DEVICE, ANOMALY DETECTION SYSTEM, AND CONTROL METHOD

CROSS REFERENCE TO RELATED APPLICATIONS

This application is a U.S. continuation application of PCT International Patent Application Number PCT/JP2019/017023 filed on Apr. 22, 2019, claiming the benefit of priority of Japanese Patent Application Number 2018-099037 filed on May 23, 2018, the entire contents of which are hereby incorporated by reference.

BACKGROUND

1. Technical Field

The present disclosure relates to an anomaly detection device, an anomaly detection system, and a control method.

2. Description of the Related Art

In recent years, a network system installed in an automobile includes multiple electronic control devices called "electronic control units (ECUs)" for controlling the automobile. These multiple ECUs are connected to each other via an in-vehicle network. A controller area network (CAN) specified in ISO 11898-1 is known as one of the standards for in-vehicle networks.

A communication channel in the CAN includes two buses. ECUs connected to the buses are referred to as "nodes". Each of the nodes connected to the buses transmits and receives a message called a "frame". The CAN uses no identifier indicating a receiver node or transmitter node. A transmitter node attaches a message identification (ID) for each frame before transmitting the frame. A receiver node receives only predetermined message IDs. Here, the bus of the CAN may be connected to an unauthorized ECU. The unauthorized ECU may masquerade as an authorized ECU to transmit a frame containing an anomalous control command (hereinafter, such a frame is referred to as an "anomalous frame"). This may put the automobile under threat of false control.

To address such a threat, K. Atsumi, et al, "Smart CAN cable, Another proposal of intrusion prevention system (IPS) for in-vehicle networks", SCIS 2018 The 35th symposium on Cryptography and Information Security Niigata, Japan, Jan. 23-26, 2018 (hereinafter, referred to as NPL 1) for example discloses a technology of specifying an ECU, which is a transmitter node that transmitted an anomalous frame, and then disconnecting this specified ECU from the bus.

SUMMARY

Unfortunately, the technology disclosed in NPL 1 described above may be unable to specify the ECU that is the transmitter node of the anomalous frame, depending on a state of the network system. Thus, this technology may fail to appropriately handle an anomalous state of the network system.

In view of this, the present disclosure provides an anomaly detection device, an anomaly detection system, and a control method with which an anomalous state of a network system can be appropriately handled.

In accordance with an aspect of the present disclosure, there is provided an anomaly detection device capable of communicating, via a network of a network system installed in a mobility entity, with a communication device establishing a one-to-one connection with an electronic control device that controls the mobility entity, the communication device comprising one or more communication devices, the electronic control device comprising one or more electronic control devices, the anomaly detection device including: an anomalous frame detector that detects an anomalous frame, the anomalous frame being an anomalous data frame transmitted from the electronic control device to the network via the communication device; a communicator that transmits an anomaly-related request frame to the communication device that is a transmitter of the anomalous frame detected, to request a response from the communication device, and receives, from the communication device, an anomaly-related response frame generated by the communication device in response to the anomaly-related request frame and indicating the transmitter of the anomalous frame; a network anomaly determiner that calculates, based on the anomaly-related response frame received, a total number of anomalous communication devices indicating a total number of communication devices each of which has transmitted the anomaly-related response frame among the one or more communication devices, and determines that the network system is in a first anomalous state when the total number of anomalous communication devices is 0 and that the network system is in a second anomalous state when the total number of anomalous communication devices is not 0; and a network anomaly handler that handles the first anomalous state when the network anomaly determiner determines that the network system is in the first anomalous state, and handles the second anomalous state when the network anomaly determiner determines that the network system is in the second anomalous state.

General or specific aspects of the present disclosure may be implemented to a system, a method, an integrated circuit, a computer program, a computer-readable recording medium such as a Compact Disc-Read Only Memory (CD-ROM), or any given combination thereof.

The anomaly detection device and so forth in an aspect according to the present disclosure are capable of appropriately handling an anomalous state of the network system.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8 illustrates an example of transmission frame information stored in a transmission frame storage of the connector according to Embodiment.

FIG. 9 illustrates an example of the number of detected anomalous frames stored in an anomalous frame storage of the IDS ECU according to Embodiment.

FIG. 10 illustrates examples of the number of anomalous connectors and the number of received anomaly-related response frames stored in a connector response storage of the IDS ECU according to Embodiment.

FIG. 11 illustrates an example of a total number of connectors stored in the connector response storage of the IDS ECU according to Embodiment.

FIG. 18 is a flowchart illustrating an anomalous-state handling process performed by the IDS ECU according to Embodiment.

DETAILED DESCRIPTION OF THE EMBODIMENTS (Underlying Knowledge Forming Basis of the Present Disclosure)

The inventors found that the technology described in "BACKGROUND ART" has the following issue.

Figure 1:
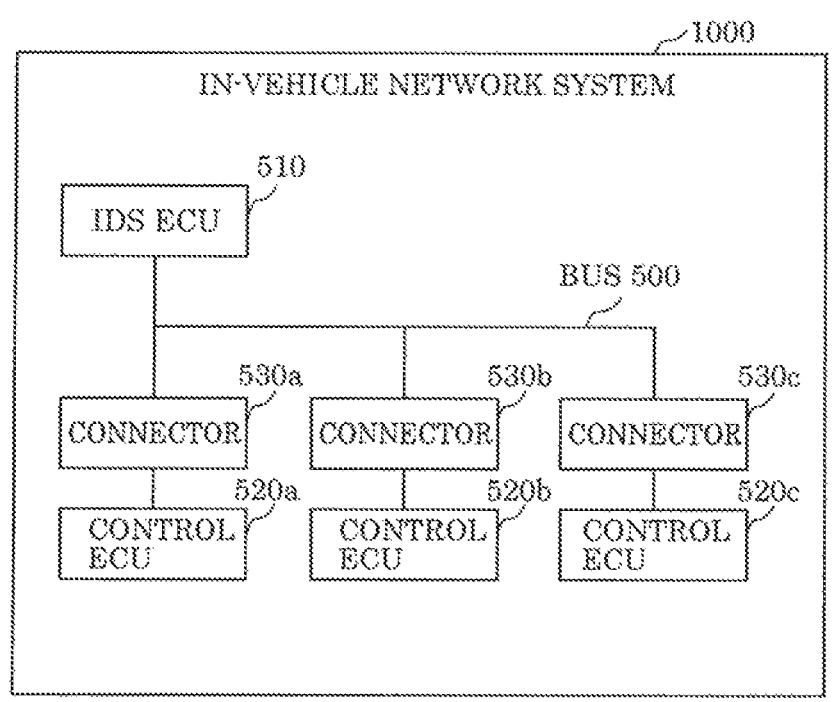
FIG. 1 is a block diagram illustrating an overall configuration of a conventional in-vehicle network system.

The aforementioned technology disclosed in NPL 1 is described with reference to FIG. 1. FIG. 1 is a block diagram illustrating an overall configuration of in-vehicle network system 1000 as a conventional example.

As illustrated in FIG. 1, in-vehicle network system 1000 includes bus 500, intrusion detection system (IDS) ECU 510, control ECUs 520a, 520b, and 520c, and connectors 530a, 530b, and 530c.

IDS ECU 510 monitors bus 500 and detects an anomalous frame transmitted to bus 500. When detecting the anomalous frame, IDS ECU 510 transmits, to each of connectors 530a, 530b, and 530c, a request frame requesting a response as to whether the connector is the transmitter of the anomalous frame. The request frame includes information about the anomalous frame.

Connectors 530a, 530b, and 530c are connected to control ECUs 520a, 520b, and 520c, respectively. Each of connectors 530a, 530b, and 530c stores information about a frame transmitted from the corresponding one of control ECUs 520a, 520b, and 520c to bus 500 via the present one of connectors 530a, 530b, and 530c (hereinafter, such a frame is referred to as a "transmission frame"). In response to the request frame from IDS ECU 510, each of connectors 530a, 530b, and 530c compares the anomalous frame with the transmission frame stored. Then, if these two frames match with each other, the connector transmits, to IDS ECU 510, a response frame indicating that the present connector is the transmitter of the anomalous frame.

This enables IDS ECU 510 to specify, among control ECUs 520a, 520b, and 520c, an anomalous control ECU that transmitted the anomalous frame, on the basis of the response frame received from one of connectors 530a, 530b, and 530c. As a result of this, a handling process can be executed by, for example, disconnecting the anomalous control ECU from bus 500.

However, if an anomalous frame is transmitted to bus 500, in-vehicle network system 1000 described as a conventional example is incapable of specifying the anomalous control ECU when: (a) an anomalous control ECU that is not connected to the connector is connected to bus 500; (b) a normal control ECU connected to the connector is disconnected from bus 500; or (c) an anomalous control ECU connected to the connector is connected to bus 500. Thus, in-vehicle network system 1000 described as a conventional example is incapable of appropriately handling an anomalous state of in-vehicle network system 1000.

In order to solve the above-described problems, in accordance with an aspect of the present disclosure, there is provided an anomaly detection device capable of communicating, via a network of a network system installed in a mobility entity, with a communication device establishing a one-to-one connection with an electronic control device that controls the mobility entity, the communication device comprising one or more communication devices, the electronic control device comprising one or more electronic control devices, the anomaly detection device including: an anomalous frame detector that detects an anomalous frame, the anomalous frame being an anomalous data frame transmitted from the electronic control device to the network via the communication device; a communicator that transmits an anomaly-related request frame to the communication device that is a transmitter of the anomalous frame detected, to request a response from the communication device, and receives, from the communication device, an anomaly-related response frame generated by the communication device in response to the anomaly-related request frame and indicating the transmitter of the anomalous frame; a network anomaly determiner that calculates, based on the anomaly-related response frame received, a total number of anomalous communication devices indicating a total number of communication devices each of which has transmitted the anomaly-related response frame among the one or more communication devices, and determines that the network system is in a first anomalous state when the total number of anomalous communication devices is 0 and that the network system is in a second anomalous state when the total number of anomalous communication devices is not 0; and a network anomaly handler that handles the first anomalous state when the network anomaly determiner determines that the network system is in the first anomalous state, and handles the second anomalous state when the network anomaly determiner determines that the network system is in the second anomalous state.

With this aspect, the network anomaly determiner can appropriately determine the anomalous state of the network system. For example, if the number of anomalous communication devices calculated by the network anomaly determiner is "0", this means that the communication device does not store information indicating that this communication device transmitted the anomalous frame to the network even though the anomalous frame detector has detected the anomalous frame. Thus, the network anomaly determiner determines that the network system is in the first anomalous state in which "an anomalous electronic control device having no communication device is connected to the network". If the number of anomalous communication devices calculated by the network anomaly determiner is not "0", the network anomaly determiner determines that the network system is in the second anomalous state. Thus, the network anomaly handler can appropriately handle the anomalous state of the network system.

For example, it is also possible that when the network anomaly determiner determines that the network system is in the second anomalous state, the communicator further transmits a state request frame to request a response from each of the one or more communication devices connected to the network and receives a state response frame as a response to the state request frame, from each of the one or more communication devices, and that when determining that the network system is in the second anomalous state, the network anomaly determiner further compares a total number of state response frames received with a total number of normal communication devices previously stored to indicate a total number of communication devices that are normal among the one or more communication devices, and determines that the network system is in: a third anomalous state when the total number of state response frames received is more than the total number of normal communication devices; a fourth anomalous state when the total number of state response frames received is less than the total number of normal communication devices; and a fifth anomalous state when the total number of state response frames received is equal to the total number of normal communication devices.

With this aspect, the network anomaly determiner can determine the anomalous state of the network system in more detail. For example, if the total number of state response frames received is more than the total number of communication devices, the network anomaly determiner determines that the network system is in the third anomalous state in which "an anomalous electronic control device having a communication device is connected to the network". For example, if the total number of state response frames received is less than the total number of communication devices, the network anomaly determiner determines that the network system is in the fourth anomalous state in which "an electronic control device incapable of communication is present". For example, if the total number of state response frames received is equal to the total number of communication devices, the network anomaly determiner determines that the network system is in the fifth anomalous state. Thus, the network anomaly handler can handle the anomalous state of the network system more effectively.

For example, it is further possible that the anomalous frame detector further counts a total number of detections of the anomalous frame for each data frame type, as a total number of detected anomalous frames, that the communicator further counts a total number of receptions of the anomaly-related response frame for each data frame type, as a total number of received anomaly-related response frames, and that when determining that the network system is in the fifth anomalous state, the network anomaly determiner further determines that the network system is in: the first anomalous state when the total number of received anomaly-related response frames is less than the total number of detected anomalous frames; and in a sixth anomalous state when the total number of received anomaly-related response frames is more than or equal to the total number of detected anomalous frames.

With this aspect, the network anomaly determiner can determine the anomalous state of the network system in more detail. The network anomaly determiner can know the number of detections of anomalous frame on the basis of the number of detected anomalous frames for each data frame type, and also know the number of receptions of anomaly-related response frame on the basis the number of received anomaly-related response frames for each data frame type. Thus, if determining that the number of received anomaly-related response frames is less than the number of detected anomalous frames, the network anomaly determiner determines that the network system is in the first anomalous state in which "an anomalous electronic control device having no communication device is connected to the network", for example. If determining that the number of received anomaly-related response frames is more than or equal to the number of detected anomalous frames, the network anomaly determiner determines that the network system is in the sixth anomalous state in which "a normal electronic control device having a communication device has been taken over", for example. Thus, the network anomaly handler can handle the anomalous state of the network system more effectively.

For example, it is further possible that the anomalous frame detector further counts a total number of detections of the anomalous frame for each data frame type, as a total number of detected anomalous frames, that the communicator further counts a total number of receptions of the anomaly-related response frame for each data frame type, as a total number of received anomaly-related response frames, and that when determining that the network system is in the second anomalous state, the network anomaly determiner further determines that the network system is: in the first anomalous state when the total number of received anomaly-related response frames is less than the total number of detected anomalous frames; and in a seventh anomalous state when the total number of received anomaly-related response frames is more than or equal to the total number of detected anomalous frames.

With this aspect, the network anomaly determiner can determine the anomalous state of the network system in more detail. The network anomaly determiner can know the number of detections of anomalous frame on the basis of the number of detected anomalous frames for each data frame type, and also know the number of receptions of anomaly-related response frame on the basis the number of received anomaly-related response frames for each data frame type. Thus, if determining that the number of received anomaly-related response frames is less than the number of detected anomalous frames, the network anomaly determiner determines that the network system is in the first anomalous state in which "an anomalous electronic control device having no communication device is connected to the network", for example. If determining that the number of received anomaly-related response frames is more than or equal to the number of detected anomalous frames, the network anomaly determiner determines that the network system is in the seventh anomalous state. Thus, the network anomaly handler can handle the anomalous state of the network system more effectively.

For example, it is still further possible that when the network anomaly determiner determines that the network system is in the seventh anomalous state, the communicator further transmits a state request frame to request a response from each of the one or more communication devices connected to the network and receives a state response frame as a response to the state request frame, from each of the one or more communication devices, and that when determining that the network system is in the seventh anomalous state, the network anomaly determiner further compares a total number of state response frames received with a total number of normal communication devices previously stored to indicate a total number of communication devices that are normal among the one or more communication devices, and determines that the network system is: in a third anomalous state when the total number of state response frames received is more than the total number of normal communication devices; in a fourth anomalous state when the total number of state response frames received is less than the total number of normal communication devices; and in a sixth anomalous state when the total number of state response frames received is equal to the total number of normal communication devices.

With this aspect, the network anomaly determiner can determine the anomalous state of the network system in more detail. For example, if the total number of state response frames received is more than the total number of communication devices, the network anomaly determiner determines that the network system is in the third anomalous state in which "an anomalous electronic control device having a communication device is connected to the network". For example, if the total number of state response frames received is less than the total number of communication devices, the network anomaly determiner determines that the network system is in the fourth anomalous state in which "an electronic control device incapable of communication is present". For example, if the total number of state response frames received is equal to the total number of communication devices, the network anomaly determiner determines that the network system is in the sixth anomalous state in which "a normal electronic control device having a communication device has been taken over". Thus, the network anomaly handler can handle the anomalous state of the network system more effectively.

For example, it is still further possible that when the network anomaly determiner determines that the network system is in the first anomalous state, the network anomaly handler transmits, to the network, a display request frame to request to display a message urging a driver of the mobility entity to safely stop the mobility entity.

With this aspect, if the network anomaly determiner determines that the network system is in the first anomalous state in which "an anomalous electronic control device having no communication device is connected to the network", it is difficult to block communication with the anomalous electronic control device. In this case, a message urging the driver to safely stop the mobility entity is displayed. This can achieve effective handling in response to the first anomalous state.

For example, it is still further possible that when the network anomaly determiner determines that the network system is in the third anomalous state, the network anomaly handler transmits, to the network, a communication stop request frame to request the communication device that has transmitted the anomaly-related response frame, to stop communication with the electronic control device connected to the communication device.

With this aspect, if the network anomaly determiner determines that the network system is in the third anomalous state in which "an anomalous electronic control device having a communication device is connected to the network", the function of the mobility entity is not affected even if this anomalous electronic control device becomes incapable of communication. Thus, in this case, communication between the electronic control device and the communication device is stopped. This can achieve effective handling in response to the third anomalous state.

For example, it is still further possible that when the network anomaly determiner determines that the network system is in the fourth anomalous state, the network anomaly handler transmits, to the network, a mobility-entity stop request frame to request the mobility entity to stop.

With this aspect, if the network anomaly determiner determines that the network system is in the fourth anomalous state in which "an electronic control device incapable of communication is present", this state is comparable to a state in which the electronic control device has a failure. Thus, in this case, the mobility entity is stopped. This can achieve effective handling in response to the fourth anomalous state.

For example, it is still further possible that when the network anomaly determiner determines that the network system is in the sixth anomalous state, the network anomaly handler transmits, to the network, an initialization request frame to request the electronic control device connected to the communication device to initialize software, the electronic control device being connected to the communication device that has transmitted the anomaly-related response frame.

With this aspect, if the network anomaly determiner determines that the network system is in the sixth anomalous state in which "a normal electronic control device having a communication device has been taken over", the electronic control device needs to return to its normal operational state. Thus, in this case, software of this electronic control device is initialized. This can achieve effective handling in response to the sixth anomalous state.

For example, it is still further possible that whenever the anomaly detection device is started or whenever a predetermined period of time has elapsed after a start of the anomaly detection device, the communicator further transmits the state request frame to each of the one or more communication devices connected to the network and updates the total number of normal communication devices on the basis of the total number of state response frames received from at least one of the one or more communication devices connected to the network.

With this aspect, the anomaly detection device does not need to previously store the total number of communication devices. Thus, the anomaly detection device is easily adaptable to different types of mobility entities having different total numbers of communication devices. This can reduce development cost for the anomaly detection device.

In accordance with another aspect of the present disclosure, there is provided an anomaly detection system that detects an anomaly caused in a network system installed in a mobility entity, the anomaly detection system including: a network that is installed in the mobility entity; an electronic control device that controls the mobility entity; a communication device that establishes a one-to-one connection with the electronic control device; and an anomaly detection device that is capable of communicating with the communication device via the network, the communication device comprising one or more communication devices, and the electronic control device comprising one or more electronic control devices, wherein the anomaly detection device includes: an anomalous frame detector that detects an anomalous frame, the anomalous frame being an anomalous data frame transmitted from the electronic control device to the network via the communication device; a first communicator that transmits an anomaly-related request frame including anomalous frame information about the anomalous frame to the communication device that is a transmitter of the anomalous frame detected, to request a response from the communication device, and receives, from the communication device, an anomaly-related response frame indicating the transmitter of the anomalous frame; a network anomaly determiner that calculates, based on the anomaly-related response frame received, a total number of anomalous communication devices indicating a total number of communication devices each of which has transmitted the anomaly-related response frame among the one or more communication devices, and determines that the network system is in a first anomalous state when the total number of anomalous communication devices is 0 and that the network system is in a second anomalous state when the total number of anomalous communication devices is not 0; and a network anomaly handler that handles the first anomalous state when the network anomaly determiner determines that the network system is in the first anomalous state, and handles the second anomalous state when the network anomaly determiner determines that the network system is in the second anomalous state, and the communication device includes: a second communicator that receives the anomaly-related response frame from the anomaly detection device, transmits the anomaly-related response frame to the anomaly detection device, and transmits, to the network, a data frame transmitted from the electronic control device connected to the communication device; a storage that stores transmission frame information about the data frame transmitted from the second communicator to the network; and a generator that compares the anomalous frame information with the transmission frame information on the basis of the anomaly-related request frame received, and generates the anomaly-related response frame when the anomalous frame information matches the transmission frame information.

This aspect can handle the anomalous state of the network system more effectively, as in the case described above.

In accordance with still another aspect of the present disclosure, there is a control method used for controlling an anomaly detection device that is capable of communicating, via a network of a network system installed in a mobility entity, with a communication device establishing a one-to-one connection with an electronic control device that controls the mobility entity, the communication device comprising one or more communication devices, the electronic control device comprising one or more electronic control devices, the control method including; detecting an anomalous frame, the anomalous frame being an anomalous data frame transmitted from the electronic control device to the network via the communication device; transmitting an anomaly-related request frame to the communication device that is a transmitter of the anomalous frame detected, to request a response from the communication device; receiving, from the communication device, an anomaly-related response frame generated by the communication device in response to the anomaly-related request frame to indicate the transmitter of the anomalous frame; calculating, based on the anomaly-related response frame received, a total number of anomalous communication devices indicating a total number of communication devices each of which has transmitted the anomaly-related response frame among the one or more communication devices; determining that the network system is in a first anomalous state when the total number of anomalous communication devices is 0 and that the network system is in a second anomalous state when the total number of anomalous communication devices is not 0; and handling the first anomalous state when the network anomaly determiner determines that the network system is in the first anomalous state, and handling the second anomalous state when the network anomaly determiner determines that the network system is in the second anomalous state.

This aspect can handle the anomalous state of the network system more effectively, as in the case described above.

The general or specific aspects of the present disclosure may be implemented to a system, a method, an integrated circuit, a computer program, a computer-readable recording medium such as a CD-ROM, or any given combination thereof.

Hereinafter, certain exemplary embodiments will be described in detail with reference to the accompanying Drawings.

The following embodiments are general and specific examples of the present disclosure. The numerical values, shapes, materials, constituent elements, arrangement and connection configuration of the constituent elements, steps, the order of the steps, etc., described in the following embodiments are merely examples, and are not intended to limit the present disclosure. Among constituent elements in the following embodiments, those not described in any one of the independent claims indicating the broadest concept of the present disclosure are described as optional constituent elements.

Embodiment

[1. Overall Configuration of Vehicle Analysis System]

Figure 2:
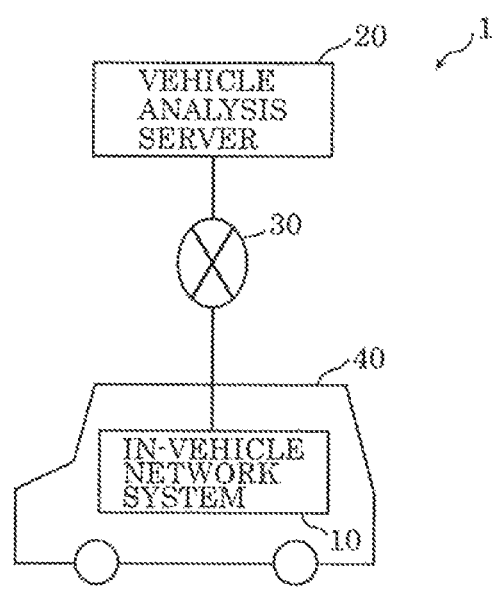
FIG. 2 is a block diagram illustrating an overall configuration of a vehicle analysis system according to Embodiment.

An overall configuration of vehicle analysis system 1 according to Embodiment is first described, with reference to FIG. 2. FIG. 2 is a block diagram illustrating the overall configuration of vehicle analysis system 1 according to Embodiment.

As illustrated in FIG. 2, vehicle analysis system 1 includes in-vehicle network system 10 and vehicle analysis server 20. Vehicle analysis system 1 is an example of an anomaly detection system for detecting an anomaly caused in in-vehicle network system 10. In-vehicle network system 10 and vehicle analysis server 20 are communicably connected to each other via external network 30, such as the Internet.

In-vehicle network system 10 is an example of a network system installed in vehicle 40, which is an automobile for example, to control a driving operation of vehicle 40. A configuration of in-vehicle network system 10 is described later. Note that vehicle 40 is an example of a mobility entity.

Vehicle analysis server 20 is a server located in, for example, a management company that manages vehicle analysis system 1. Vehicle analysis server 20 collects, for example, communication logs and anomalous states from in-vehicle network system 10 installed in various types of vehicle 40 in various regions. With this, vehicle analysis server 20 monitors the state of in-vehicle network system 10. Such monitoring enables vehicle analysis server 20 to perform centralized vehicle analysis to track down the cause of the anomalous state.

[2. Overall Configuration of in-Vehicle Network System]

Figure 3:
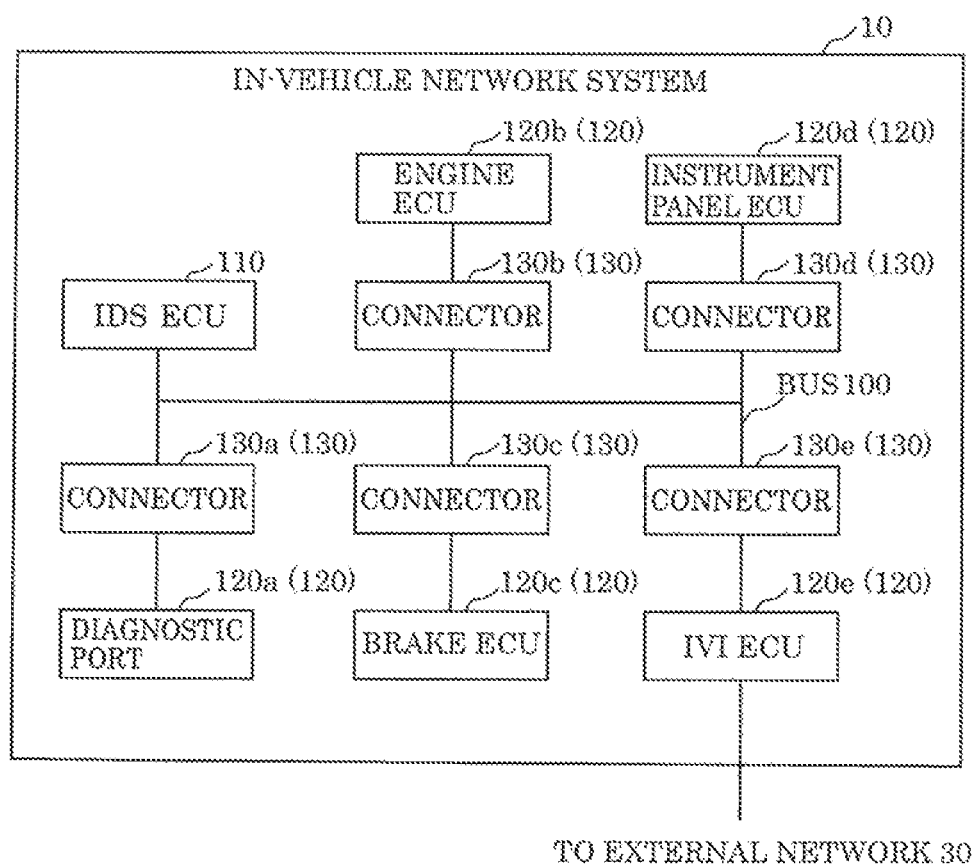
FIG. 3 is a block diagram illustrating an overall configuration of an in-vehicle network system according to Embodiment.

Next, an overall configuration of in-vehicle network system 10 according to Embodiment is described, with reference to FIG. 3. FIG. 3 is a block diagram illustrating the overall configuration of in-vehicle network system 10 according to Embodiment.

As illustrated in FIG. 3, in-vehicle network system 10 includes bus 100, IDS ECU 110, diagnostic port 120*a*, engine ECU 120b, brake ECU 120c, instrument panel ECU 120d (hereinafter, referred to as "inpane ECU 120d"), in-vehicle information (IVI) ECU 120e, and connectors 130a, 130b, 130c, 130d, and 130e.

Bus 100 is an example of a network used for communication under a CAN protocol, and is built in vehicle 40 (see FIG. 2).

IDS ECU 110 is an example of an anomaly detection device that monitors bus 100 to detect an anomaly caused in in-vehicle network system 10. A configuration of IDS ECU 110 is described later.

Each of diagnostic port 120a, engine ECU 120b, brake ECU 120c, inpane ECU 120d, and IVI ECU 120e is an example of an electronic control device that controls the driving operation of vehicle 40. Diagnostic port 120a, engine ECU 120b, brake ECU 120c, inpane ECU 120d, and IVI ECU 120e have basically the same configuration. Thus, these components may be generically referred to as "ECU 120" in the following description.

Diagnostic port 120a is a port typically called an on-board diagnostic (OBD) port. For example, the connection of a dedicated terminal owned by an automobile dealer to diagnostic port 120a enables, for instance, failure diagnosis to be performed on ECU 120 connected to bus 100.

Engine ECU 120b controls the number of revolutions of an engine (not shown) of vehicle 40, on the basis of information obtained from bus 100.

Brake ECU 120c controls a brake (not shown) of vehicle 40, on the basis of information obtained from bus 100.

Inpane ECU 120d controls displaying of an instrument panel (not shown) of vehicle 40, on the basis of information obtained from bus 100.

IVI ECU 120e controls an in-vehicle device (not shown) that operates an information system, such as a car navigation system or an audio head unit, included in vehicle 40. IVI ECU 120e is capable of communicating with an external server (not shown) via a dedicated line. IVI ECU 120e has functions, such as updating map information and various applications and notifying vehicle analysis server 20 about an anomaly.

Connectors 130a, 130b, 130c, 130d, and 130e are examples of communication devices that establish a one-to-one connection between bus 100 and diagnostic port 120a, engine ECU 120b, brake ECU 120c, inpane ECU 120d, and IVI ECU 120e, respectively. Connectors 130a, 130b, 130c, 130d, and 130e have basically the same configuration. Thus, these connectors may be generically referred to as "connector 130" in the following description.

Connector 130 transfers, to bus 100, a CAN-protocol-based data frame (hereinafter, simply referred to as a "frame") transmitted from ECU 120, and stores transmission frame information about the frame transmitted from ECU 120 (hereinafter, this frame is also referred to as a "transmission frame"). Moreover, connector 130 transfers a frame that is transmitted to bus 100 from another ECU 120 different from ECU 120 connected to the present connector 130, to ECU 120 connected to the present connector 130.

Furthermore, connector 130 receives an anomaly-related request frame that includes an anomalous-connector request ID (described later) and is transmitted from IDS ECU 110 to bus 100. Note that the anomaly-related request frame includes anomalous-frame information about a frame determined to be anomalous by IDS ECU 110 (hereinafter, referred to as an "anomalous frame") among frames transmitted from ECU 120 to bus 100 via connector 130. When receiving an anomaly-related request frame, connector 130 compares the anomalous-frame information included in this anomaly-related request frame with the transmission frame information stored in the present connector 130. If these information items match with each other, the present connector 130 transmits, to IDS ECU 110, an anomaly-related response frame indicating that the present connector 130 is the transmitter of the anomalous frame. A configuration of connector 130 is described later.

[3. Frame Format]

Figure 4:
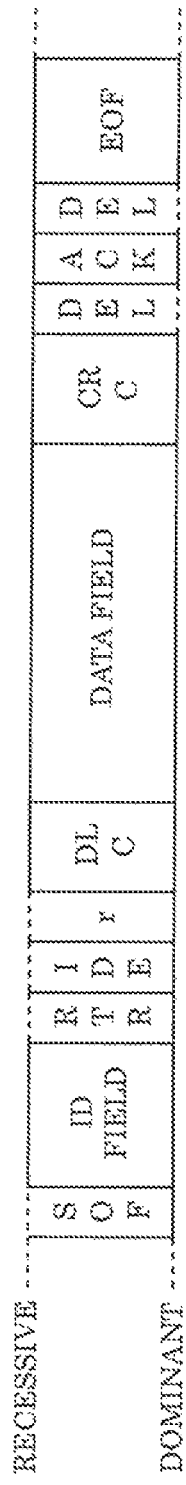
FIG. 4 illustrates a frame format used by the in-vehicle network system according to Embodiment.

Next, a frame format used by in-vehicle network system 10 is described with reference to FIG. 4. FIG. 4 illustrates the frame format used by in-vehicle network system 10 according to Embodiment. FIG. 4 illustrates a frame in a standard ID format under the CAN protocol.

As illustrated in FIG. 4, the frame include: a Start Of Frame (SOF); an ID field; a Remote Transmission Request (RTR); an IDentifier Extension (IDE); a reserved bit (r); a data length code (DLC); a data field; a Cyclic Redundancy Check (CRC) sequence; a CRC delimiter (DEL); an Acknowledgement slot (ACK); an ACK delimiter (DEL); and an End of Frame (EOF).

The SOF is a 1-bit dominant. The SOF is recessive while bus 100 is in an idle state. A recessive-to-dominant transition of the SOF provides notification of the start of frame transmission.

The ID field has a 11-bit length to indicate a data type. If a plurality of nodes (ECU 120) start transmission at the same time, communication arbitration is performed using this ID field. A frame having a smaller value as an ID is designed to have higher priority.

The RTR is a 1-bit dominant indicating that this is a frame. Each of the IDE and the r is a 1-bit dominant.

The DLC is a 4-bit value indicating a length of the data field. The data field has up to 64 bits representing content of the data to be transmitted. The length of the data field is adjustable in unit of 8 bits. Specifications for the data to be transmitted depend on the type or manufacturer of vehicle 40.

The CRC sequence has a 15-bit length. The CRC sequence is calculated from transmission values of the SOF, the ID field, the control field, and the data field. The CRC delimiter is a 1-bit recessive and indicates an end of the CRC sequence.

The ACK slot has a 1-bit length. A transmission node transmits a recessive from this slot. A reception node transmits a dominant if the fields from the beginning to the CRC sequence have been normally received. Here, a dominant state is prioritized.

The ACK delimiter is a 1-bit recessive and indicates an end of the ACK slot. The EOF is a 7-bit recessive and indicates an end of the data frame.

[4. Configuration of Connector]

Figure 5:
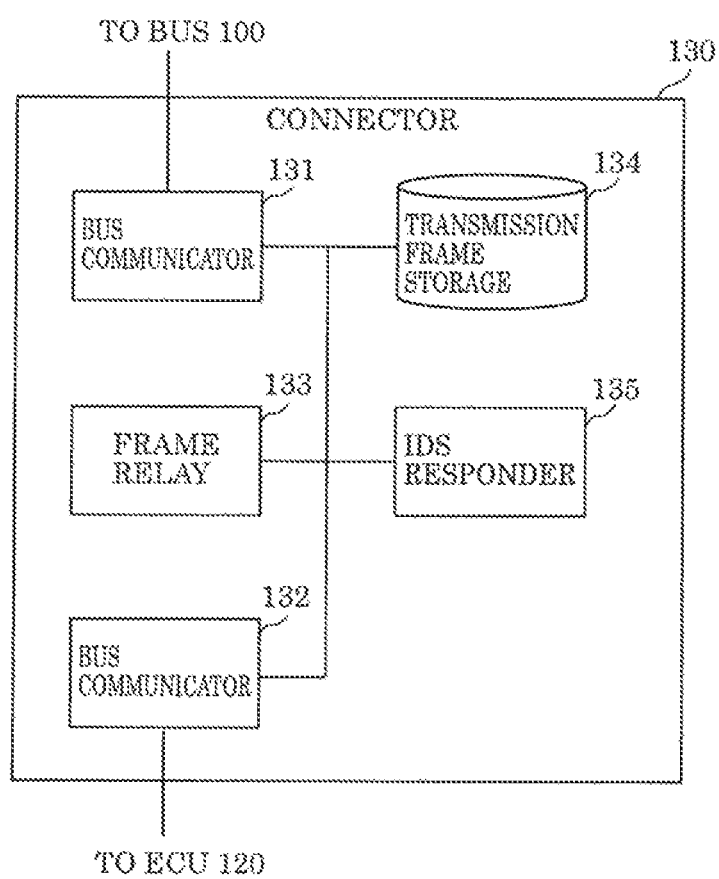
FIG. 5 is a block diagram illustrating a configuration of a connector according to Embodiment.

Next, a configuration of connector 130 is described with reference to FIG. 5. FIG. 5 is a block diagram illustrating the configuration of connector 130 according to Embodiment.

As illustrated in FIG. 5, connector 130 includes bus communicator 131 (an example of a second communicator), bus communicator 132, frame relay 133, transmission frame storage 134 (an example of a storage), and IDS responder 135 (an example of a generator).

Bus communicator 131 transmits and receives frames to and from each of bus 100 and frame relay 133. To be more specific, bus communicator 131 receives a frame transmitted from frame relay 133, and then transmits the received frame to bus 100. Moreover, bus communicator 131 receives a frame transmitted from bus 100, and then transmits the received frame to frame relay 133.

Bus communicator 132 transmits and receives frames to and from ECU 120 having a one-to-one connection with connector 130, and to and from frame relay 133. To be more specific, bus communicator 132 receives a frame transmitted from ECU 120 having the one-to-one connection with connector 130, and then transmits the received frame to frame relay 133. Moreover, bus communicator 132 receives a frame transmitted from frame relay 133, and then transmits the received frame to ECU 120 having the one-to-one connection with connector 130.

Frame relay 133 receives a frame transmitted from bus communicator 131, and then transmits the received frame to bus communicator 132 and IDS responder 135. Moreover, frame relay 133 receives a frame transmitted from bus communicator 132, and then transmits the received frame to bus communicator 131 and transmission frame storage 134.

If the frame received from bus communicator 131 includes an anomalous-connector request ID, frame relay 133 transmits this frame (hereinafter, referred to as the "anomaly-related request frame") to IDS responder 135. Here, the anomalous-connector request ID is used for requesting a response from connector 130 that transmitted the anomalous frame. The anomaly-related request frame includes, in addition to the anomalous-connector request ID, a hash value of this anomalous frame as anomalous frame information about the anomalous frame.

If the frame received from bus communicator 131 includes an all-connectors request ID, frame relay 133 transmits this frame (hereinafter, referred to as the "state request frame") to IDS responder 135. Here, the all-connectors request ID is used for requesting responses from all connectors 130 (130a, 130b, 130c, 130e, and 130e) connected to bus 100.

Furthermore, frame relay 133 transmits, to bus communicator 131, a frame (an anomaly-related response frame or a state response frame described later) transmitted from IDS responder 135.

As transmission frame information about the frame transmitted from bus communicator 132 to frame relay 133 (that is, the transmission frame transmitted from ECU 120 having the one-to-one connection with connector 130), transmission frame storage 134 stores, for example, the hash value of this transmission frame. The transmission frame information is described later.

When receiving the anomaly-related response frame from frame relay 133, IDS responder 135 compares the hash value of the anomalous frame included in the anomaly-related response frame with the hash value of the transmission frame from ECU 120 that is stored in transmission frame storage 134. If these values are found to match with each other as a result of the aforementioned comparison, IDS responder 135 generates an anomaly-related response frame including an anomalous-connector response ID, and transmits the generated anomaly-related response frame to frame relay 133. Here, the anomalous-connector response ID is predetermined for each connector 130 and indicates a response to the anomaly-related request frame.

When receiving the state request frame from frame relay 133, IDS responder 135 generates a state response frame including an all-connectors response ID and transmits the generated state response frame to frame relay 133. Here, the all-connectors response ID is predetermined for each connector 130 and indicates a response to the state request frame.

[5. Configuration of ECU]

Figure 6:
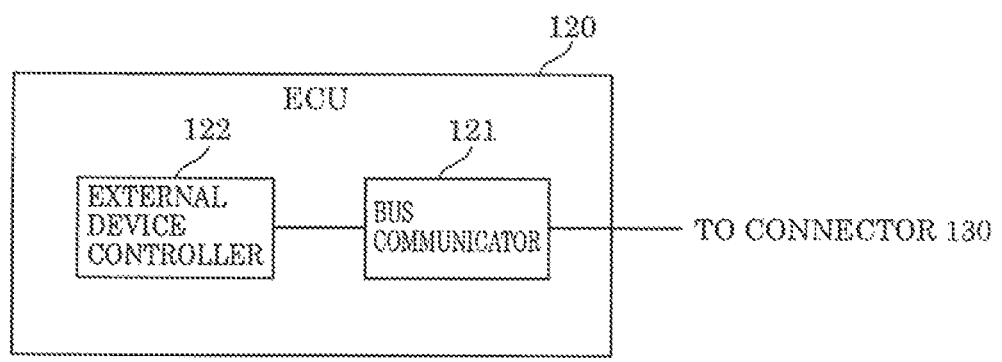
FIG. 6 is a block diagram illustrating a configuration of an ECU according to Embodiment.

Next, a configuration of ECU 120 is described with reference to FIG. 6. FIG. 6 is a block diagram illustrating the configuration of ECU 120 according to Embodiment.

As illustrated in FIG. 6, ECU 120 includes bus communicator 121 and external device controller 122.

Bus communicator 121 receives a frame transmitted from connector 130, and then transmits the received frame to external device controller 122. Moreover, bus communicator 121 receives a frame transmitted from external device controller 122, and then transmits the received frame to connector 130.

External device controller 122 is connected to an external device (not shown) included in vehicle 40. Examples of the external device include the engine, the brake, the instrument panel, the car navigation system, and the audio head unit. External device controller 122 reads control information about the external device included in the frame received from connector 130 via bus communicator 121, and controls the external device on the basis of the read control information. Moreover, external device controller 122 collects information obtained from the external device and generates a frame including the collected information. External device controller 122 transmits the generated frame to bus communicator 121.

For ECU 120 that is engine ECU 120b for example, external device controller 122 is connected to the engine as the external device. In response to an engine revolution control request included in the frame received from bus communicator 121, external device controller 122 performs control to increase or decrease the number of revolutions of the engine. Moreover, to notify another ECU 120 (such as inpane ECU 120d) of the current number of revolutions of the engine, external device controller 122 generates a frame including engine revolution information and transmits the generated frame to bus communicator 121.

For ECU 120 that is brake ECU 120c for example, external device controller 122 is connected to the brake as the external device. For ECU 120 that is inpane ECU 120d, external device controller 122 is connected to the instrument panel as the external device. For ECU 120 that is IVI ECU 120e, external device controller 122 is connected to the navigation system as the external device. In these cases, ECU 120 obtains corresponding information from the external device connected to this ECU 120 to control this external device.

[6. Configuration of IDS ECU]

Figure 7:
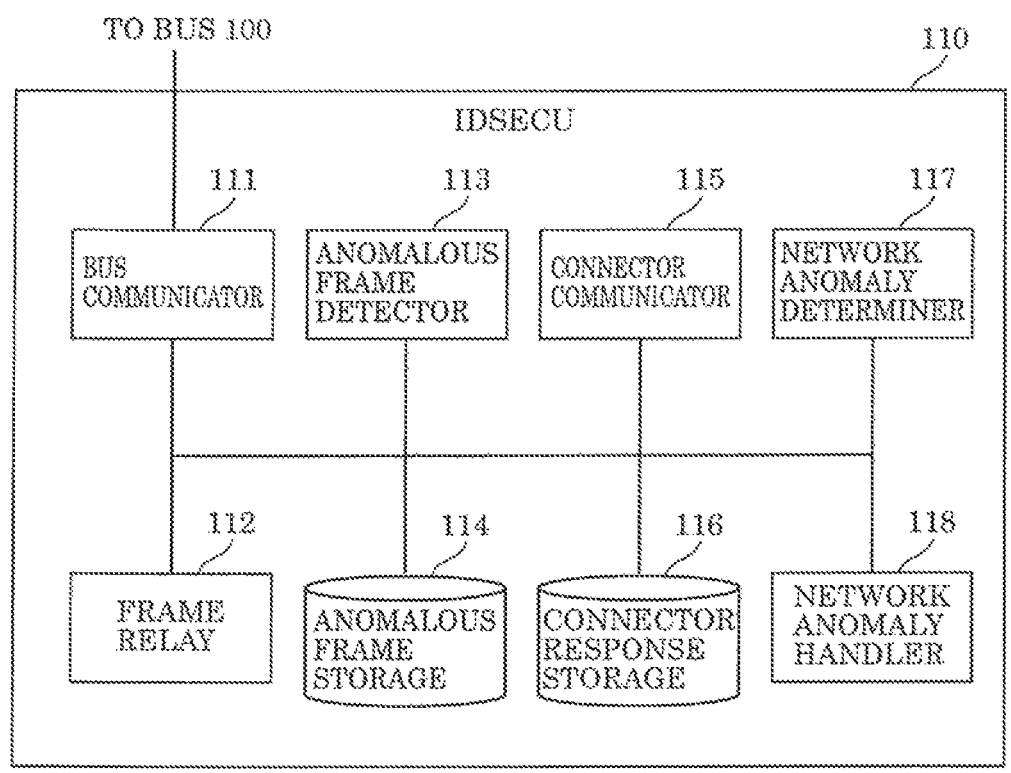
FIG. 7 is a block diagram illustrating a configuration of an IDS ECU according to Embodiment.

Next, a configuration of IDS ECU 110 is described with reference to FIG. 7. FIG. 7 is a block diagram illustrating the configuration of IDS ECU 110 according to Embodiment.

As illustrated in FIG. 7, IDS ECU 110 includes bus communicator 111, frame relay 112, anomalous frame detector 113, anomalous frame storage 114, connector communicator 115 (an example of a communicator and a first communicator), connector response storage 116, network anomaly determiner 117, and network anomaly handler 118.

Bus communicator 111 receives a frame transmitted from connector 130 to bus 100, and then transmits the received frame to frame relay 112. Moreover, bus communicator 111 receives a frame transmitted from frame relay 112, and then transmits the received frame to bus 100.

Frame relay 112 receives a frame transmitted from bus communicator 111, and then transmits the received frame to anomalous frame detector 113. When receiving an anomaly-related response frame or a state response frame from bus communicator 111, frame relay 112 transmits the received anomaly-related response frame or state response frame to connector communicator 115.

Moreover, frame relay 112 receives a frame (an anomaly-related request frame or a state request frame) from connector communicator 115, and then transmits the received frame to bus communicator 111. Furthermore, frame relay 112 receives a frame transmitted from network anomaly handler 118, and then transmits the received frame to bus communicator 111.

Anomalous frame detector 113 receives the frame transmitted from frame relay 112 (that is, the frame transmitted from ECU 120 to bus 100 via connector 130). Then, anomalous frame detector 113 determines whether the received frame is an anomalous frame, according to a predetermined anomaly detection rule. If detecting the anomalous frame, anomalous frame detector 113 stores a hash value of this anomalous frame into anomalous frame storage 114. Moreover, anomalous frame detector 113 counts the number of detected anomalous frames for each hash value of the anomalous frame (that is, for each data frame type). Then, anomalous frame detector 113 stores the counted number of detected anomalous frames into anomalous frame storage 114. Furthermore, anomalous frame detector 113 transmits the hash value of the anomalous frame to connector communicator 115 and also notifies network anomaly determiner 117 that the anomalous frame has been detected. The number of detected anomalous frames is described later.

Anomalous frame storage 114 stores the hash value of the anomalous frame detected by anomalous frame detector 113 and the number of detected anomalous frames counted by anomalous frame detector 113.

Connector communicator 115 receives the hash value of the anomalous frame transmitted from anomalous frame detector 113. Based on the received hash value of the anomalous frame, connector communicator 115 generates an anomaly-related request frame including the hash value of the anomalous frame and the anomalous-connector request ID, and then transmits the generated anomaly-related request frame to frame relay 112.

When receiving the anomaly-related response frame transmitted from frame relay 112, connector communicator 115 verifies the anomalous-connector response ID that is included in the received anomaly-related response frame and predetermined for each connector 130. Connector communicator 115 calculates the number of types of anomalous-connector response ID, as the number of connectors 130 that have responded to the anomaly-related request frame (hereinafter, referred to as the "number of anomalous connectors") (an example of the number of anomalous communication devices). Then, connector communicator 115 stores the calculated number of anomalous connectors into connector response storage 116. Moreover, connector communicator 115 counts the number of received anomaly-related response frames for each hash value of the anomalous frame. Then, connector communicator 115 stores the counted number of received anomaly-related response frames into connector response storage 116.

Furthermore, connector communicator 115 generates a state request frame including an all-connectors request ID, and then transmits the generated state request frame to frame relay 112. Note that whenever IDS ECU 110 is started or whenever a predetermined period of time (30 minutes, for example) has elapsed after the startup of IDS ECU 110, connector communicator 115 generates a state request frame and transmits the generated state request frame to frame relay 112.

Moreover, when receiving the state response frame transmitted from frame relay 112, connector communicator 115 verifies the all-connectors response ID that is included in the received state response frame and predetermined for each connector 130. Connector communicator 115 calculates the number of types of all-connectors response ID (that is, the number of received state response frames), as the number of connectors 130 that have responded to the state request frame (hereinafter, referred to as the "total number of connectors") (an example of the total number of communication devices). Then, connector communicator 115 stores the calculated total number of connectors into connector response storage 116. Furthermore, connector communicator 115 stores a reception time of the state response frame into connector response storage 116.

Connector response storage 116 stores, for example: the number of anomalous connectors and the total number of connectors calculated by connector communicator 115; the number of received anomaly-related response frames counted by connector communicator 115; and the time when the state response frame was received by connector communicator 115.

After a fixed period of time has elapsed from reception of the notification from anomalous frame detector 113, network anomaly determiner 117 determines an anomalous state of in-vehicle network system 10 as follows.

If the number of anomalous connectors stored in connector response storage 116 is "0", network anomaly determiner 117 determines that in-vehicle network system 10 is in a first anomalous state in which "an anomalous ECU having no connector is connected to the bus". If the number of anomalous connectors stored in connector response storage 116 is not "0" (that is, 1 or more), network anomaly determiner 117 determines that in-vehicle network system 10 is in a second anomalous state.

If determining that in-vehicle network system 10 is in the second anomalous state, network anomaly determiner 117 compares the current total number of connectors stored in connector response storage 116 (that is, the number of received state response frames) with a past total number of connectors (that is, the number of normal connectors 130 previously stored in connector response storage 116). If the current total number of connectors is more than the past total number of connectors, network anomaly determiner 117 determines that in-vehicle network system 10 is in a third anomalous state in which "an anomalous ECU having a connector is connected to the bus". In contrast, if the current total number of connectors is less than the past total number of connectors, network anomaly determiner 117 determines that in-vehicle network system 10 is in a fourth anomalous state in which "an ECU incapable of communication is present." If the current total number of connectors is equal to the past total number of connectors, network anomaly determiner 117 determines that in-vehicle network system 10 is in a fifth anomalous state.

If determining that in-vehicle network system 10 is in the fifth anomalous state, network anomaly determiner 117 compares the number of received anomaly-related response frames stored in connector response storage 116 with the number of detected anomalous frames stored in anomalous frame storage 114. If the number of received anomaly-related response frames is less than the number of detected anomalous frames, network anomaly determiner 117 determines that in-vehicle network system 10 is in the first anomalous state in which "an anomalous ECU having no connector is connected to the bus". In contrast, if the number of received anomaly-related response frames is equal to the number of detected anomalous frames (more than or equal to the number of detected anomalous frames), network anomaly determiner 117 determines that in-vehicle network system 10 is in a sixth anomalous state in which "a normal ECU having a connector has been taken over".

Moreover, if determining the anomalous state of in-vehicle network system 10, network anomaly determiner 117 transmits information indicating the determined anomalous state to network anomaly handler 118.

When receiving the information indicating the anomalous state transmitted from network anomaly determiner 117, network anomaly handler 118 executes handling predetermined for each anomalous state.

If in-vehicle network system 10 is in the first anomalous state in which "an anomalous ECU having no connector is connected to the bus", disconnection of communication with this anomalous ECU 120 is difficult. Thus, in this case, network anomaly handler 118 transmits, to frame relay 112, a display request frame to request IVI ECU 120e to display a message urging a driver to safely stop vehicle 40 on the instrument panel, for example.

If in-vehicle network system 10 is in the sixth anomalous state in which "a normal ECU having a connector has been taken over", normal ECU 120 falsely taken over needs to return to its normal operational state. Thus, in this case, network anomaly handler 118 transmits, to frame relay 112, an initialization request frame to request the normal ECU 120, which is connected to connector 130 that transmitted the anomaly-related response frame, to initialize software.

If in-vehicle network system 10 is in the fourth anomalous state in which "an ECU incapable of communication is present", this state is comparable to a state in which ECU 120 has a failure. Thus, in this case, network anomaly handler 118 transmits, to frame relay 112, a vehicle stop request frame to request vehicle 40 to stop.

If in-vehicle network system 10 is in the third anomalous state in which "an anomalous ECU having a connector is connected to the bus", control of vehicle 40 is not affected even if the anomalous ECU 120 falsely connected to bus 100 becomes incapable of communication. Thus, in this case, network anomaly handler 180 transmits, to frame relay 112, a communication stop request frame to request connector 130, which transmitted the anomaly-related response frame, to stop communication with the anomalous ECU 120.

[7. Example of Transmission Frame Information Stored in Transmission Frame Storage]

Next, an example of the transmission frame information stored in transmission frame storage 134 of connector 130 is described, with reference to FIG. 8. FIG. 8 illustrates an example of the transmission frame information stored in transmission frame storage 134 of connector 130 according to Embodiment.

As illustrated in FIG. 8, transmission frame storage 134 of connector 130 stores the transmission frame information including the following items: the ID of the transmission frame transmitted from ECU 120 connected to connector 130; the hash value of the transmission frame; and the number of transmissions of the transmission frame. These items are stored in association with each other.

The example in FIG. 8 shows that the transmission frame with the ID "110" has the hash value "B8 C9 32 14 AD 23 33 AB" and that the number of transmissions of the transmission frame is "2". This example also shows that the transmission frame with the ID "120" has the hash value "C1 99 56 11 D3 23 43 B3" and that the number of transmissions of the transmission frame is "1".

Whenever ECU 120 having a one-to-one connection with connector 130 transmits a transmission frame, transmission frame information about this transmission frame is stored into transmission frame storage 134 of connector 130. When receiving an anomaly-related response frame transmitted from IDS ECU 110, connector 130 compares the hash value of the anomalous frame with the hash value of the transmission frame. If these values match with each other, connector 130 determines that ECU 120 having the one-to-one connection with the present connector 130 is the transmitter of the anomalous frame. Then, connector 130 transmits, to IDS ECU 110, an anomaly-related response frame indicating that the present connector 130 is the transmitter of the anomalous frame.

[8. Number of Detected Anomalous Frames Stored in Anomalous Frame Storage]

Next, an example of the number of detected anomalous frames stored in anomalous frame storage 114 of IDS ECU 110 is described, with reference to FIG. 9. FIG. 9 illustrates an example of the number of detected anomalous frames stored in anomalous frame storage 114 of IDS ECU 110 according to Embodiment.

As illustrated in FIG. 9, anomalous frame storage 114 of IDS ECU 110 stores the ID of the anomalous frame, the hash value of the anomalous frame, and the number of detected anomalous frames, in association with each other.

The example in FIG. 9 shows that the anomalous frame with the ID "100" has the hash value "A9 B1 43 91 6A CA 92 AA" and that the number of detected anomalous frames is "1". This indicates that the anomalous frame having the hash value "A9 B1 43 91 6A CA 92 AA" has been detected once.

This example also shows that the anomalous frame with the ID "110" has the hash value "B8 C9 32 14 AD 23 33 AB" and that the number of detected anomalous frames is "3". This indicates that the anomalous frame having the hash value "B8 C9 32 14 AD 23 33 AB" has been detected three times.

IDS ECU 110 determines the anomalous state of in-vehicle network system 10 on the basis of the number of detected anomalous frames described above. To be more specific, IDS ECU 110 compares the number of detected anomalous frames that is the number of times the anomalous frame has been detected, with the number of received anomaly-related response frames that is the number of times the anomaly-related response frame has been received. If the number of received anomaly-related response frames is less than the number of detected anomalous frames, IDS ECU 110 determines that in-vehicle network system 10 is in the first anomalous state in which "an anomalous ECU having no connector is connected to the bus". In contrast, if the number of received anomaly-related response frames is more than or equal to the number of detected anomalous frames, IDS ECU 110 determines that in-vehicle network system 10 is in the sixth anomalous state in which "a normal ECU having a connector has been taken over".

[9. Examples of Number of Anomalous Connectors and Number of Received Anomaly-Related Response Frames Stored in Connector Response Storage]

Next, examples of the number of anomalous connectors and the number of received anomaly-related response frames stored in connector response storage 116 of IDS ECU 110 are described, with reference to FIG. 10. FIG. 10 illustrates the examples of the number of anomalous connectors and the number of received anomaly-related response frames stored in connector response storage 116 of IDS ECU 110 according to Embodiment.

As illustrated in FIG. 10, connector response storage 116 of IDS ECU 110 stores the ID of the anomalous frame, the hash value of the anomalous frame, the number of anomalous connectors, and the number of received anomaly-related response frames, in association with each other.

The example in FIG. 10 shows that the anomalous frame with the ID "100" has the hash value "A9 B1 43 91 6A CA 92 AA", that the number of anomalous connectors is "1", and that the number of received anomaly-related response frames is "1". This indicates that the number of connectors 130 that responded to the anomaly-related request frame regarding the anomalous frame having the hash value "A9 BR 43 91 6A CA 92 AA" is one, and that the number of times the anomaly-related response frame transmitted from this one connector 130 is once.

This example also shows that the anomalous frame with the ID "110" has the hash value "B8 09 32 14 AD 23 33 AB", that the number of anomalous connectors is "2", and that the number of received anomaly-related response frames is "3". This indicates that the number of connectors that responded to the anomaly-related request frame regarding the anomalous frame having the hash value "B8 C9 32 14 AD 23 33 AB" is two, and that the number of times the anomaly-related response frame transmitted from these two connectors 130 is three times.

IDS ECU 110 determines the anomalous state of in-vehicle network system 10 on the basis of the number of anomalous connectors described above. To be more specific, if the number of anomalous connectors is "0", IDS ECU 110 determines that in-vehicle network system 10 is in the first anomalous state in which "an anomalous ECU having no connector is connected to the bus".

[10. Example of Total Number of Connectors Stored in Connector Response Storage]

Next, an example of the total number of connectors stored in connector response storage 116 of IDS ECU 110 is described, with reference to FIG. 11. FIG. 11 illustrates the example of the total number of connectors stored in connector response storage 116 of IDS ECU 110 according to Embodiment.

As illustrated in FIG. 11, connector response storage 116 of IDS ECU 110 stores the reception time of the state response frame and the total number of connectors, in association with each other.

The example in FIG. 11 shows that the total number of connectors is "41" at time T1, and that the total number of connectors is "40" at a time T2 that is later than time T1.

IDS ECU 110 determines the anomalous state of in-vehicle network system 10 on the basis of the total number of connectors described above. To be more specific, IDS ECU 110 compares the current total number of connectors with the past total number of connectors. If the current total number of connectors is more than the past total number of connectors, IDS ECU 110 determines that in-vehicle network system 10 is in the third anomalous state in which "an anomalous ECU having a connector is connected to the bus" In contrast, if the current total number of connectors is less than the past total number of connectors, IDS ECU 110 determines that in-vehicle network system 10 is in the fourth anomalous state in which "an ECU incapable of communication is present". If the current total number of connectors is equal to the past total number of connectors and the number of received anomaly-related response frames is more than or equal to the number of detected anomalous frames, IDS ECU 110 determines that in-vehicle network system 10 is in the sixth anomalous state in which "a normal ECU having a connector has been taken over."

[11. Processes Performed by in-Vehicle Network System]

The following describes processes performed by IDS ECU 110, after ECU 120 of in-vehicle network system 10 transmits a frame, to (i) detect an anomalous frame, (ii) determine an anomalous state of in-vehicle network system 10, and (iii) handle the determined anomalous state.

[11.1 Anomalous-Frame Detection Process]

Figure 12:
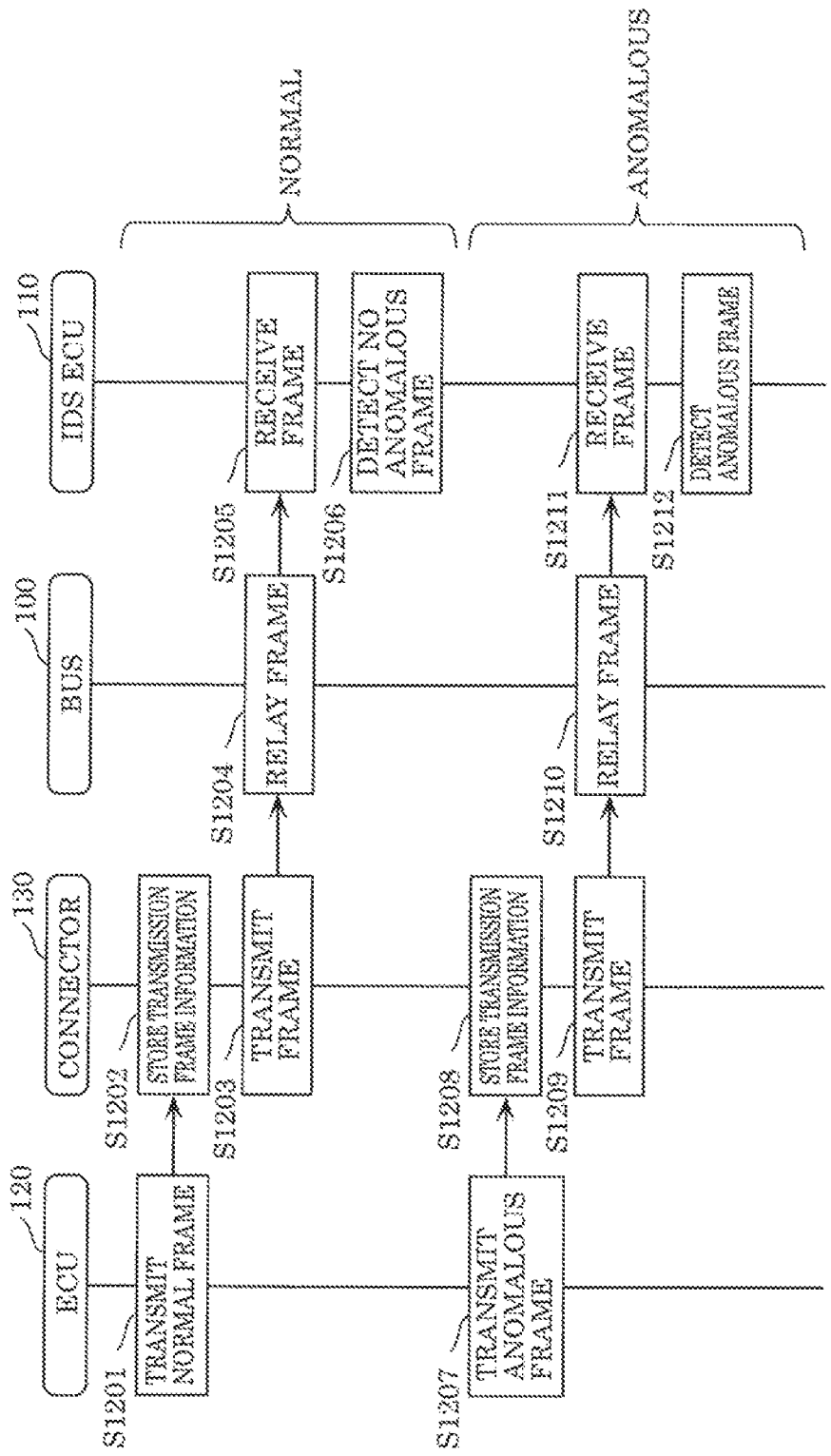
FIG. 12 is a sequence diagram illustrating an anomalous-frame detection process performed by the in-vehicle network system according to Embodiment.

The anomalous-frame detection process performed by in-vehicle network system 10 is described, with reference to FIG. 12. FIG. 12 is a sequence diagram illustrating the anomalous-frame detection process performed by in-vehicle network system 10 according to Embodiment.

A process performed when ECU 120 transmits a normal frame is first described.

As illustrated in FIG. 12, ECU 120 generates a normal frame and transmits the generated normal frame to connector 130 connected to this ECU 120 (S1201). Note that the frame follows the frame format illustrated in FIG. 4.

Receiving the frame transmitted from ECU 120, connector 130 calculates a hash value of the received frame and then stores transmission frame information about the received frame (see FIG. 8) into transmission frame storage 134 (S1202). If transmission frame storage 134 already stores the same hash value, the number of transmissions corresponding to this hash value is incremented by "1". Connector 130 transmits, to bus 100, the frame received from ECU 120 (S1203).

Receiving the frame transmitted from connector 130, bus 100 relays the received frame to all ECUs 120 (including IDS ECU 110) connected to bus 100 (S1204).

IDS ECU 110 receives the frame relayed by bus 100 (S1205). IDS ECU 110 determines whether the received frame is an anomalous frame, according to the predetermined anomaly detection rule. Here, because the received frame is normal, the aforementioned anomaly detection rule is inapplicable to this frame. Thus, IDS ECU 110 detects no anomalous frame in this case (S1206).

Under the anomaly detection rule, if a difference between the speed of vehicle 40 included in the frame received most recently and the speed of vehicle 40 included in the frame received at this time is beyond a normal range (+10 km/h to −10 km/h) for example, the frame received at this time is detected as an anomalous frame. For instance, if the aforementioned difference between the two speeds is −60 km/h, the frame received at this time is detected as an anomalous frame.

Alternatively, under the anomaly detection rule, if a difference between the reception time of the frame received most recently and the reception time of the frame received at this time is beyond a normal range (10 milliseconds), the frame received at this time may be detected as an anomalous frame. For instance, if the aforementioned difference between the two reception times is 2 milliseconds, the frame received at this time is detected as an anomalous frame.

Next, the following describes a process performed when, for example, ECU 120 falsely taken over by a malicious attacker transmits an anomalous frame different from a normal frame.

As illustrated in FIG. 12, ECU 120 transmits, to connector 130, an anomalous frame to falsely control vehicle 40, for example (S1207). Such transmission of the anomalous frame from ECU 120 may cause vehicle 40 to perform an unsafe and anomalous action. For example, if the attacker intends to increase the speed of vehicle 40 to 100 km/h, ECU 120 (engine ECU 120b, for example) transmits an anomalous frame indicating that the current speed of vehicle 40 is 20 km/h, which is slower than the actual current speed of 80 km/h. This anomalous frame thus requires, for example, the engine of vehicle 40 to increase acceleration more than needed to reach the target speed.

After this, as in Steps S1202 to S1205 described above, Steps S1208 to S1211 are similarly executed. Subsequent to Step S1211, IDS ECU 110 determines whether the received frame is an anomalous frame, according to the predetermined anomaly detection rule. Here, because the received frame is anomalous, the aforementioned anomaly detection rule is applicable to this frame. Thus, IDS ECU 110 determines that the received frame is anomalous, and thus detects the anomalous frame in this case (S1212).

After this, anomalous frame detector 113 of IDS ECU 110 stores the hash value of the anomalous frame into anomalous frame storage 114. Here, if anomalous frame storage 114 already stores the same hash value, the number of detected anomalous frames corresponding to this hash value is incremented by "1."

[11.2 Anomalous-State Determination Process]

Figure 13:
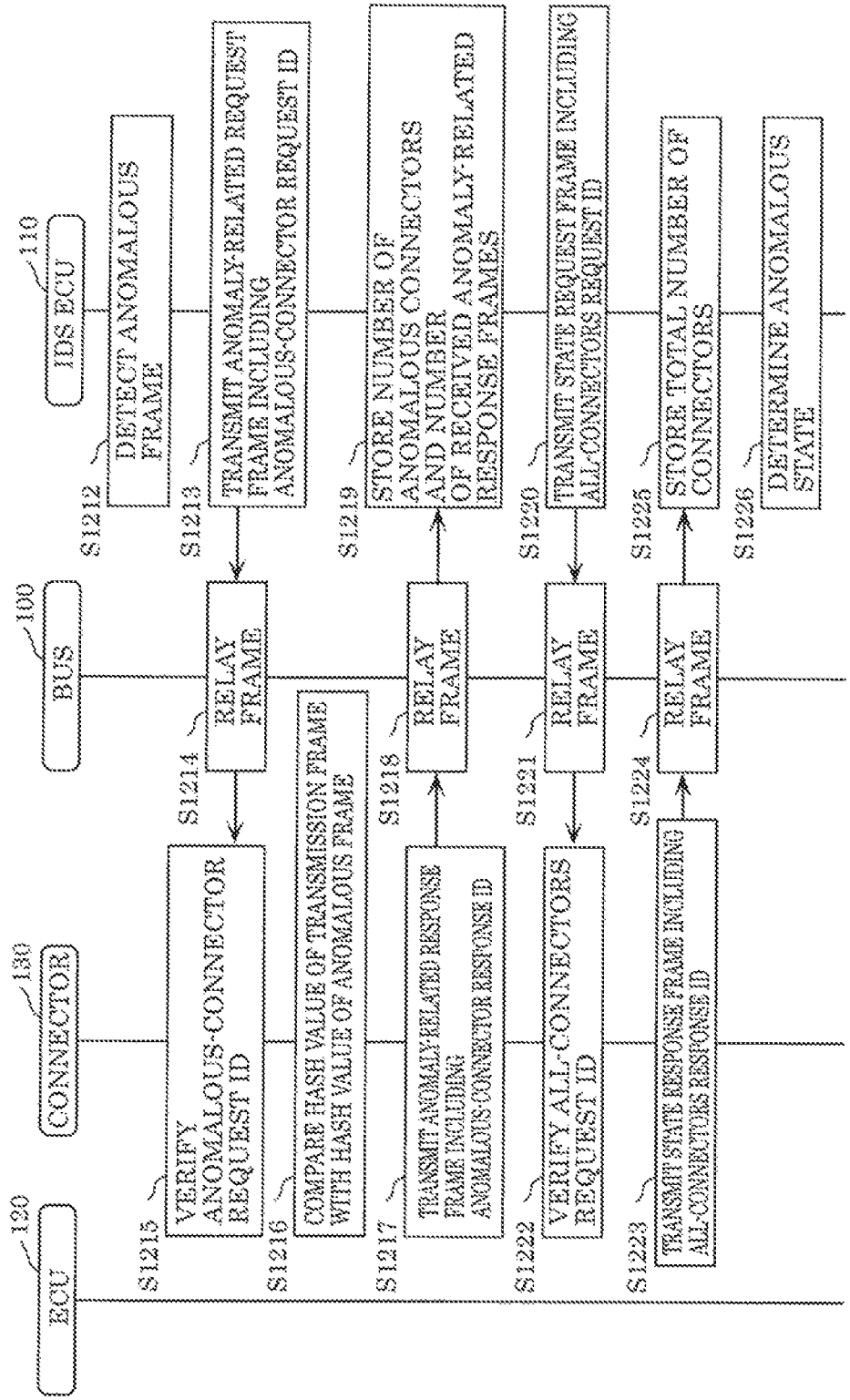
FIG. 13 is a sequence diagram illustrating an anomalous-state determination process performed by the in-vehicle network system according to Embodiment.

Next, an anomalous-state determination process performed by in-vehicle network system 10 is described, with reference to FIG. 13. FIG. 13 is a sequence diagram illustrating the anomalous-state determination process performed by in-vehicle network system 10 according to Embodiment.

As illustrated in FIG. 13, after Step S1212 described above, connector communicator 115 of IDS ECU 110 generates an anomaly-related request frame including an anomalous-connector request ID and transmits the generated anomaly-related request frame to bus 100 (S1213). Note that a data area of the anomaly-related request frame stores the hash value of the anomalous frame.

Receiving the anomaly-related request frame transmitted from IDS ECU 110, bus 100 relays the received anomaly-related request frame to all connectors 130 connected to bus 100 (S1214).

Receiving the anomaly-related request frame relayed by bus 100, IDS responder 135 of connector 130 verifies whether the received anomaly-related request frame includes the anomalous-connector request ID (S1215). If the received anomaly-related request frame includes the anomalous-connector request ID, IDS responder 135 of connector 130 compares the hash value of the transmission frame stored in transmission frame storage 134 with the hash value of the anomalous frame stored in the anomaly-related response frame (S1216).

If determining that the hash value of the transmission frame matches the hash value of the anomalous frame as a result of the comparison made in Step S1216, IDS responder 135 of connector 130 generates an anomaly-related response frame including an anomalous-connector response ID predetermined for each connector 130 and transmits the generated anomaly-related response frame to bus 100 (S1217).

Receiving the anomaly-related response frame transmitted from connector 130, bus 100 relays the received anomaly-related response frame to IDS ECU 110 connected to bus 100 (S1218).

Receiving the anomaly-related response frame relayed by bus 100, connector communicator 115 of IDS ECU 110 verifies the anomalous-connector response ID included in the received anomaly-related response frame. The anomalous-connector response ID is predetermined for each connector 130. Thus, connector communicator 115 of IDS ECU 110 calculates the number of types of anomalous-connector response ID as the number of anomalous connectors and then stores the number of anomalous connectors into connector response storage 116 for each hash value of the anomalous frame (S1219). Moreover, connector communicator 115 of IDS ECU 110 calculates the number of receptions of anomaly-related response frame as the number of received anomaly-related response frames and then stores the number of received anomaly-related response frames into connector response storage 116 for each hash value of the anomalous frame (S1219). Here, if connector response storage 116 already stores the same hash value, the number of received anomaly-related response frames corresponding to this hash value is incremented by "1". Information about the number of anomalous connectors and about the number of received anomaly-related response frames stored in connector response storage 116 is illustrated in FIG. 10.

Connector communicator 115 of IDS ECU 110 generates a state request frame including an all-connectors request ID and transmits the generated state request frame to bus 100 (S1220).

Receiving the state request frame transmitted from IDS ECU 110, bus 100 relays the received state request frame to all connectors 130 connected to bus 100 (S1221).

Receiving the state request frame relayed by bus 100, IDS responder 135 of connector 130 verifies whether the received state request frame includes the all-connectors request ID (S1222). If the received state request frame includes the all-connectors request ID, connector 130 generates a state response frame including an all-connectors response ID predetermined for each connector 130 and transmits the generates state response frame to bus 100 (S1223).

Receiving the state response frame transmitted from connector 130, bus 100 relays the received state response frame to IDS ECU 110 connected to bus 100 (S1224).

Receiving the state response frame relayed by bus 100, connector communicator 115 of IDS ECU 110 verifies the all-connectors response ID included in the received state response frame. The all-connectors response ID is predetermined for each connector 130. Thus, connector communicator 115 of IDS ECU 110 calculates the number of types of all-connectors response ID as the total number of connectors and stores the total number of connectors together with the reception time into connector response storage 116 (S1225). Information about the total number of connectors and about the reception time stored in connector response storage 116 is illustrated in FIG. 11.

Network anomaly determiner 117 of IDS ECU 110 determines the anomalous state of in-vehicle network system 10, on the basis of the information stored in anomalous frame storage 114 and connector response storage 116 (S1226). The anomalous-state determination process performed by IDS ECU 110 is described later.

[11.3 Anomalous-State Handling Process]

Figure 14:
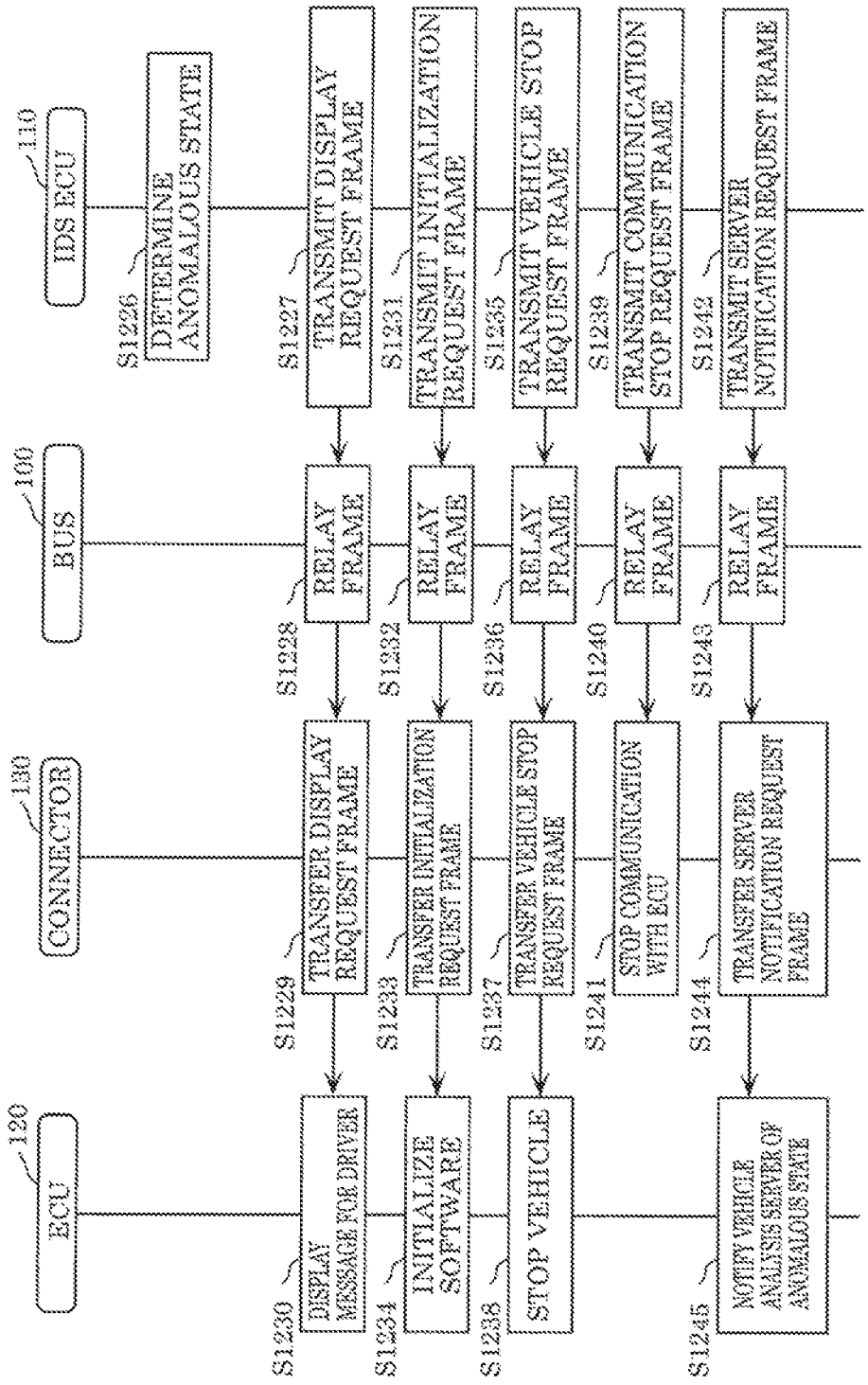
FIG. 14 is a sequence diagram illustrating an anomalous-state handling process performed by the in-vehicle network system according to Embodiment.

Next, an anomalous-state handling process performed by in-vehicle network system 10 is described with reference to FIG. 14. FIG. 14 is a sequence diagram illustrating the anomalous-state handling process performed by in-vehicle network system 10 according to Embodiment.

As illustrated in FIG. 14, after Step S1226 described above, network anomaly handler 118 of IDS ECU 110 executes the anomalous-state handling process in response to the result of the anomalous-state determination made by network anomaly determiner 117.

For the purpose of description in FIG. 14, Steps S1227 to S1230, Steps S1231 to S1234, Steps S1235 to S1238, and Steps S1239 to S1241 included in the anomalous-state handling process are illustrated as if executed in these respective orders. In reality however, network anomaly handler 118 selectively executes any one of the steps in each sequence.

If in-vehicle network system 10 is determined to be in the first anomalous state, network anomaly handler 118 of IDS ECU 110 transmits, to bus 100, a display request frame including a display request ID to request VI ECU 120e to display a message urging the driver to safely stop vehicle 40 on the instrument panel, for example (S1227).

Receiving the display request frame transmitted from IDS ECU 110, bus 100 relays the received display request frame to connector 130 connected to bus 100 (S1228).

Receiving the display request frame relayed by bus 100, connector 130 transfers the display request frame to ECU 120 (VI ECU 120e) (1229).

On the basis of the display request ID included in the transferred display request frame, IVI ECU 120e displays the message urging the driver to safely stop vehicle 40 on the instrument panel, for example (1230).

If in-vehicle network system 10 is determined to be in the sixth anomalous state, network anomaly handler 118 of IDS ECU 110 transmits, to bus 100, an initialization request frame including an initialization request ID to request normal ECU 120, which is connected to connector 130 that transmitted the anomaly-related response frame, to initialize software (S1231).

Receiving the initialization request frame transmitted from IDS ECU 110, bus 100 relays the received initialization request frame to connector 130 connected to bus 100 (S1232).

Receiving the initialization request frame relayed by bus 100, connector 130 transfers the received initialization request frame to ECU 120 (S1233).

On the basis of the initialization request ID included in the transferred initialization request frame, ECU 120 initializes the software of ECU 120 (S1234).

If in-vehicle network system 10 is determined to be in the fourth anomalous state, network anomaly handler 118 of IDS ECU 110 transmits, bus 100, a vehicle stop request frame including a vehicle stop request ID to request vehicle 40 to stop (S1235).

Receiving the vehicle stop request frame transmitted from IDS ECU 110, bus 100 relays the received vehicle stop request frame to connector 130 connected to bus 100 (S1236).

Receiving the vehicle stop request frame relayed by bus 100, connector 130 transfers the received vehicle stop request frame to ECU 120 (brake ECU 120c) (S1237).

On the basis of the vehicle stop request ID included in the transferred vehicle stop request frame, brake ECU 120c controls the brake of vehicle 40 to stop vehicle 40 (S1238).

If in-vehicle network system 10 is determined to be in the third anomalous state, network anomaly handler 118 of IDS ECU 110 transmits, to bus 100, a communication stop request frame including a communication stop request ID to request connector 130, which transmitted the anomaly-related response frame, to stop communication with the anomalous ECU 120 (S1239).

Receiving the communication stop request frame transmitted from IDS ECU 110, bus 100 relays the communication stop request frame to connector 130 connected to bus 100 (1240).

Receiving the communication stop request frame relayed by bus 100, connector 130 stops communication with ECU 120 connected to this connector 130, on the basis of the communication stop request ID included in the received communication stop request frame (S1241).

After any of the sequences of Steps S1227 to S1230, Steps S1231 to S1234, Steps S1235 to S1238, and Steps S1239 to S1241 described above is executed, network anomaly handler 118 of IDS ECU 110 transmits, to bus 100, a server notification request frame including a server notification request ID to request IVI ECU 120e to notify vehicle analysis server 20 about the anomalous state (S1242).

Receiving the server notification request frame transmitted from IDS ECU 110, bus 100 relays the received server notification request frame to connector 130 connected to bus 100 (S1243).

Receiving the server notification request frame relayed by bus 100, connector 130 transfers the received server notification request frame to ECU 120 (IVI ECU 120e) (S1244).

On the basis of the server notification request ID included in the transferred server notification request frame, IVI ECU 120e notifies vehicle analysis server 20 about the anomalous state of in-vehicle network system 10 (S1245).

[12. Process Performed by Connector]

Figure 15:
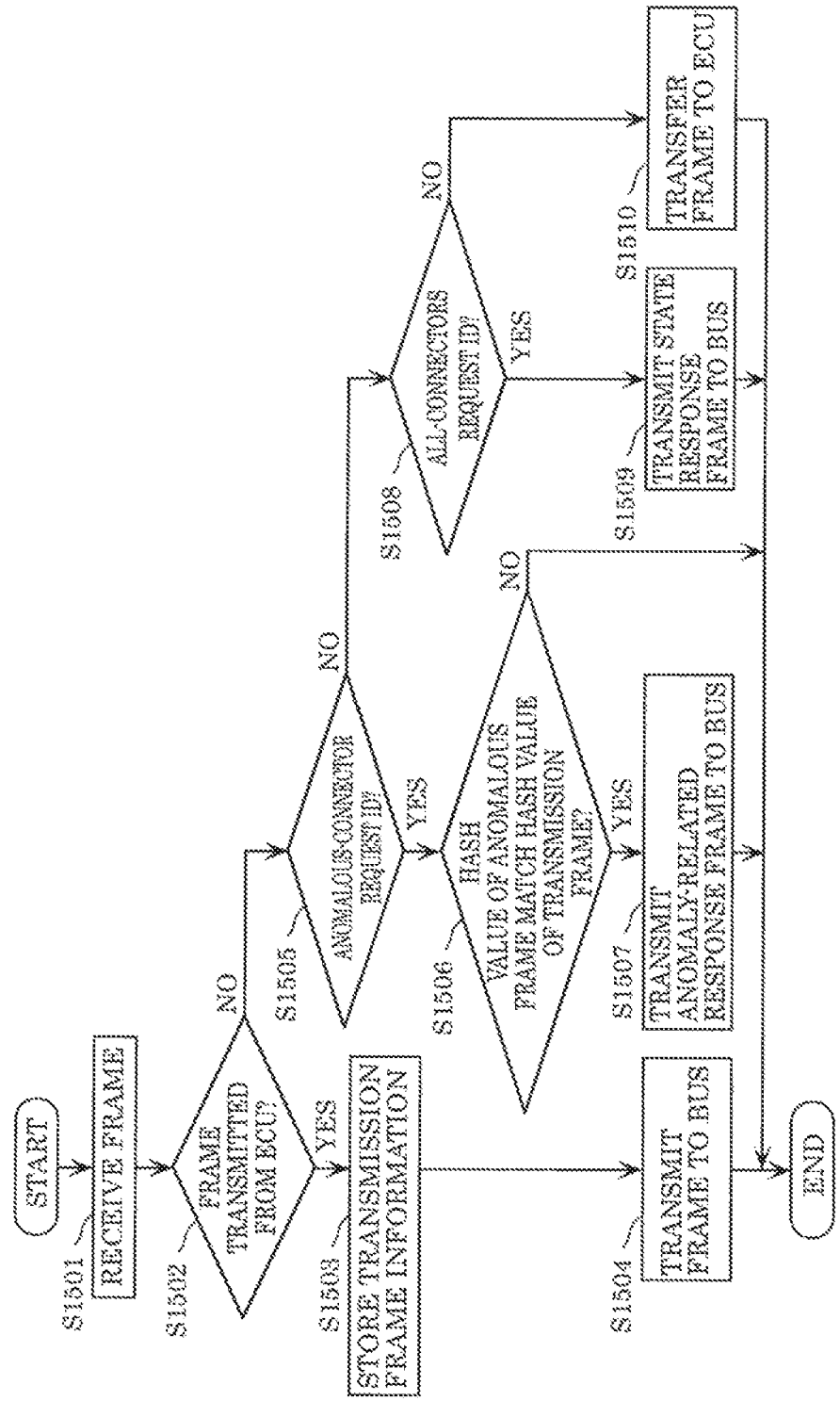
FIG. 15 is a flowchart illustrating a process performed by a connector according to Embodiment.

Next, a process performed by connector 130 is described with reference to FIG. 15. FIG. 15 is a flowchart illustrating the process performed by connector 130 according to Embodiment.

As illustrated in FIG. 15, bus communicator 131 of connector 130 receives a frame transmitted from bus 100, and bus communicator 132 receives a frame transmitted from ECU 120 (1501).

Frame relay 133 of connector 130 verifies whether the received frame is transmitted from ECU 120 (S1502).

If the received frame is from ECU 120 (Yes in S1502), frame relay 133 stores the transmission frame information about the transmission frame into transmission frame storage 134 (S1503). After this, frame relay 133 transmits, to bus communicator 132, the frame received from bus communicator 131. Then, bus communicator 132 transmits, to bus 100, the frame received from frame relay 133 (1504).

Referring back to Step S1502, if the received frame is not from ECU 120 (No in S1502), frame relay 133 verifies whether the ID included in the received frame is an anomalous-connector request ID (1505).

If the ID included in the received frame is an anomalous-connector request ID (Yes in S1505), IDS responder 135 verifies the data area of the received frame (anomaly-related request frame) to read the hash value of the anomalous frame. Then, IDS responder 135 determines whether the hash value of the anomalous frame matches the hash value of the transmission frame stored in transmission frame storage 134 (S1506).

If the hash value of the anomalous frame matches the hash value of the transmission frame (Yes in S1506), IDS responder 135 generates an anomaly-related response frame including an anomalous-connector response ID predetermined for each connector 130. Frame relay 133 transmits the generated anomaly-related response frame to bus 100 via bus communicator 131 (S1507).

Referring back to Step S1506, if the hash value of the anomalous frame does not match the hash value of the transmission frame (No in S1506), the process ends here.

Referring back to S1505, if the ID included in the received frame is not an anomalous-connector request ID (No in S1505), frame relay 133 verifies whether the ID included in the received frame is an all-connectors request ID (S1508).

If the ID included in the received frame is an all-connectors request ID (Yes in S1508), IDS responder 135 generates a state response frame including an all-connectors response ID predetermined for each connector 130. Frame relay 133 transmits the generated state response frame to bus 100 via bus communicator 131 (S1509).

Referring back to S1508, if the ID included in the received frame is not an all-connectors request ID (No in S1508), frame relay 133 transfers the received frame to ECU 120 via bus communicator 132 (S1510).

[13. Process Performed by IDS ECU]

[13-1. Anomalous-State Determination Process]

Figure 16:
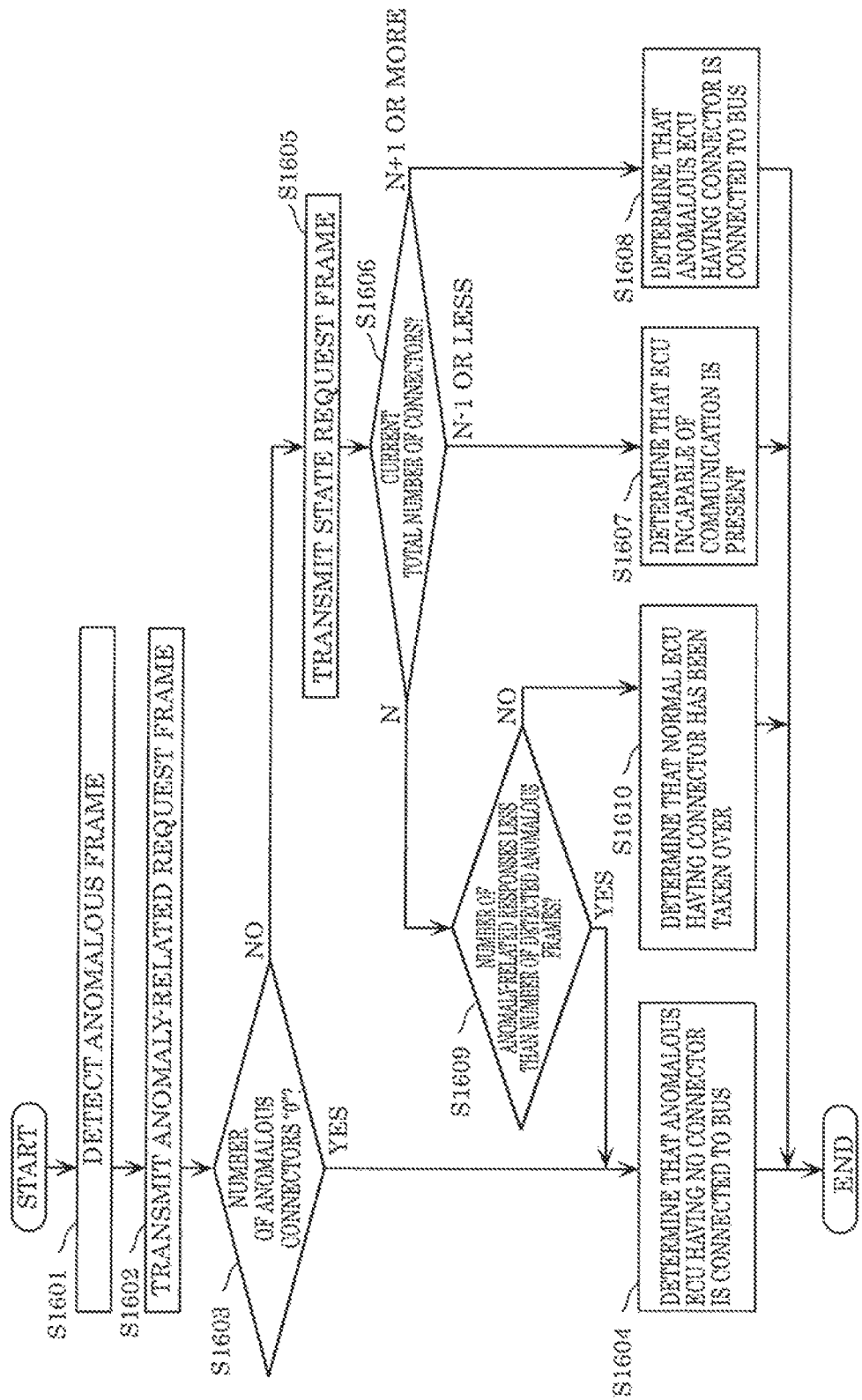
FIG. 16 is a flowchart illustrating an anomalous-state determination process performed by the IDS ECU according to Embodiment.

Next, an anomalous-state determination process performed by IDS ECU 110 is described with reference to FIG. 16. FIG. 16 is a flowchart illustrating the anomalous-state determination process performed by IDS ECU 110 according to Embodiment.

As illustrated in FIG. 16, anomalous frame detector 113 of IDS ECU 110 detects an anomalous frame (S1601). Then, anomalous frame detector 113 stores the hash value of the detected anomalous frame and the number of detected anomalous frames into anomalous frame storage 114.

Connector communicator 115 of IDS ECU 110 generate an anomaly-related request frame including an anomalous-connector request ID, and transmits the generated anomaly-related request frame to bus 100 via frame relay 112 and bus communicator 111 (S1602). Here, the data area of the anomaly-related request frame stores the hash value of the anomalous frame. Receiving the anomaly-related response frame including the anomalous-connector response ID, connector communicator 115 stores the number of anomalous connectors and the number of received anomaly-related response frames into connector response storage 116.

Network anomaly determiner 117 of IDS ECU 110 verifies whether the number of anomalous connectors stored in connector response storage 116 is "0" (S1603).

If the number of anomalous connectors is "0" (Yes in S1603), network anomaly determiner 117 determines that in-vehicle network system 10 is in the first anomalous state in which "an anomalous ECU having no connector is connected to the bus" (S1604).

Referring back to Step S1603, if the number of anomalous connectors is not "0" (No in S1603), network anomaly determiner 117 determines that in-vehicle network system 10 is in the second anomalous state. In this case, connector communicator 115 generates a state request frame including an all-connectors request ID and transmits the generated state request frame to bus via frame relay 112 and bus communicator 111 (S1605). Receiving the state response frame including the all-connectors response ID, connector communicator 115 stores the total number of connectors and the reception time into connector response storage 116.

Network anomaly determiner 117 verifies whether the current total number of connectors stored in connector response storage 116 matches a past total number of connectors (a number N) (S1606).

If the current total number of connectors is less than the past total number of connectors ("N−1 or less" in S1606), network anomaly determiner 117 determines that in-vehicle network system 10 is in the fourth anomalous state in which "an ECU incapable of communication is present" (S1607).

Referring back to S1606, if the current total number of connectors is more than the past total number of connectors ("N+1 or more" in S1606), network anomaly determiner 117 determines that in-vehicle network system 10 is in the third anomalous state in which "an anomalous ECU having a connector is connected to the bus" (S1608).

Referring back to S1606, if the current total number of connectors is equal to the past total number of connectors ("N" in S1606), network anomaly determiner 117 determines that in-vehicle network system 10 is in the fifth anomalous state. In this case, network anomaly determiner 117 compares the number of received anomaly-related response frames stored in connector response storage 116 with the number of detected anomalous frames stored in anomalous frame storage 114 (S1609).

If the number of received anomaly-related response frames is less than the number of detected anomalous frames (Yes in S1609), network anomaly determiner 117 determines that in-vehicle network system 10 is in the first anomalous state described above (S1604). In contrast, if the number of received anomaly-related response frames is more than or equal to the number of detected anomalous frames (No in S1609), network anomaly determiner 117 determines that in-vehicle network system 10 is in the sixth anomalous state in which "a normal ECU having a connector has been taken over" (S1610).

[13-2. Variation of Anomalous-State Determination Process]

Figure 17:
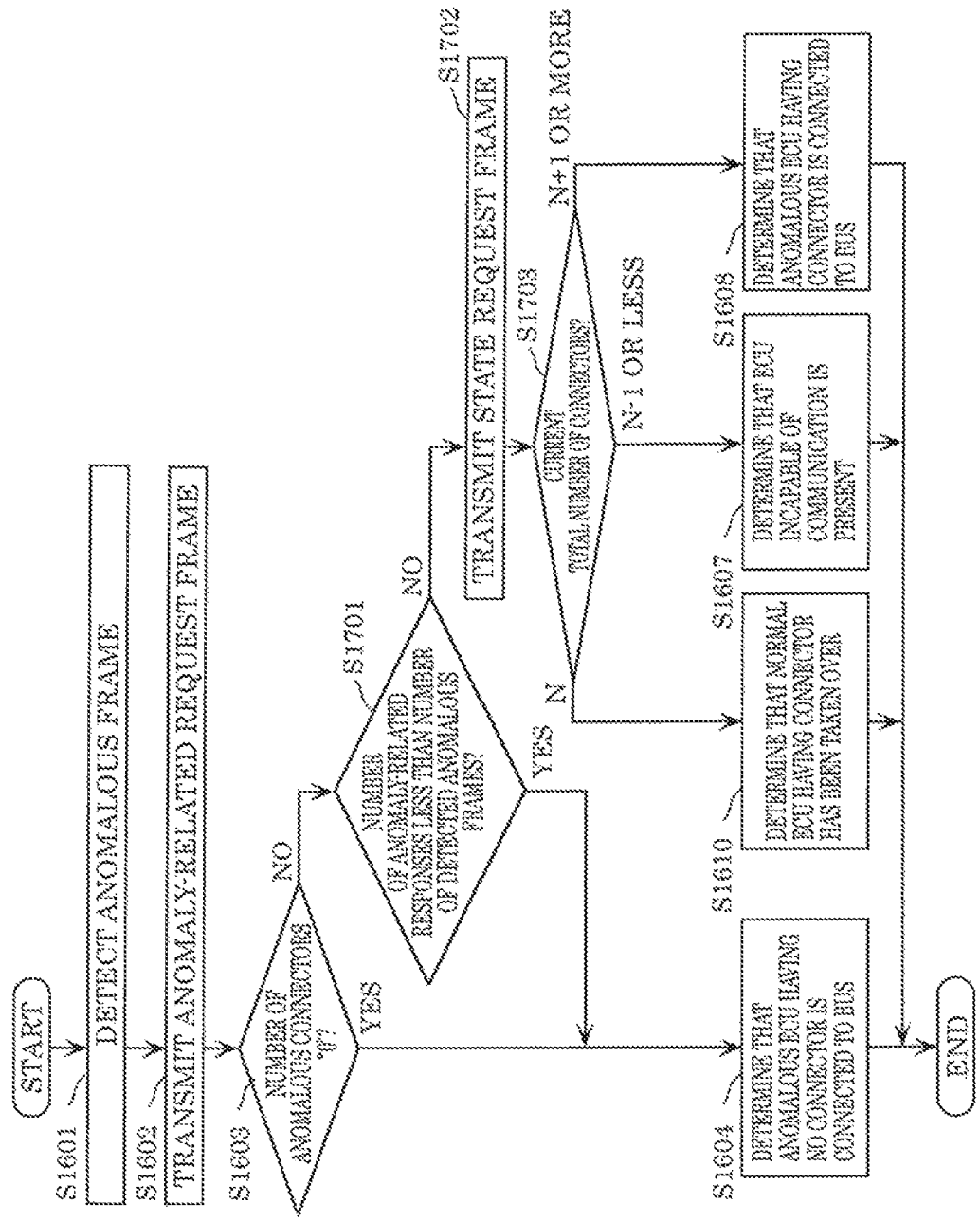
FIG. 17 is a flowchart illustrating a variation of the anomalous-state determination process performed by the IDS ECU according to Embodiment.

A variation of the anomalous-state determination process performed by IDS ECU 110 is described with reference to FIG. 17. FIG. 17 is a flowchart illustrating the variation of the anomalous-state determination process performed by IDS ECU 110 according to Embodiment. In the flowchart of FIG. 17, the same process as that included in the flowchart of FIG. 16 is assigned the same step number as in FIG. 16 and description on this step is not repeated here.

As illustrated in FIG. 17, Steps S1601 to S1604 are first executed similarly to the above. If the number of anomalous connectors is not "0" in Step S1603 (No in S1603), network anomaly determiner 117 determines that in-vehicle network system 10 is in the second anomalous state. In this case, network anomaly determiner 117 compares the number of received anomaly-related response frames stored in connector response storage 116 with the number of detected anomalous frames stored in anomalous frame storage 114 (S1701).

If the number of received anomaly-related response frames is less than the number of detected anomalous frames (Yes in S1701), network anomaly determiner 117 proceeds to Step S1604. In contrast, if the number of received anomaly-related response frames is more than or equal to the number of detected anomalous frames (No in S1701), network anomaly determiner 117 determines that in-vehicle network system 10 is in a seventh anomalous state. In this case, connector communicator 115 generates a state request frame including an all-connectors request ID and transmits the generated state request frame to bus 100 via frame relay 112 and bus communicator 111 (S1702). Receiving the state response frame including the all-connectors response ID, connector communicator 115 stores the total number of connectors and the reception time into connector response storage 116.

Network anomaly determiner 117 verifies whether the current total number of connectors stored in connector response storage 116 matches a past total number of connectors (a number N) (S1703). If the current total number of connectors is less than the past total number of connectors ("N−1 or less" in S1703), network anomaly determiner 117 proceeds to Step S1607 described above. If the current total number of connectors is more than the past total number of connectors ("N+1 or more" in S1703), network anomaly determiner 117 proceeds to Step S1608 described above. If the current total number of connectors is equal to the past total number of connectors ("N" in S1703), network anomaly determiner 117 proceeds to Step S1610 described above.

[13-3. Anomalous-State Handling Process]

Next, an anomalous-state handling process performed by IDS ECU 110 is described with reference to FIG. 18. FIG. 18 is a flowchart illustrating the anomalous-state handling process performed by IDS ECU 110 according to Embodiment.

As illustrated in FIG. 18, network anomaly handler 118 of IDS ECU 110 verifies the type of anomalous state determined by network anomaly determiner 117 (S1801).

If the anomalous state determined by network anomaly determiner 117 is the third anomalous state ("anomalous ECU having no connector is connected to bus" in S1801), network anomaly handler 118 generates a display request frame and transmits the generated display request frame to bus 100 via frame relay 112 and bus communicator 111. With this, network anomaly handler 118 requests IVI ECU 120e to display a message urging the driver to safely stop vehicle 40 on the instrument panel, for example (S1802).

Referring back to Step S1801, if the anomalous state determined by network anomaly determiner 117 is the sixth anomalous state ("normal ECU having connector has been taken over" in S1801), network anomaly handler 118 generates an initialization request frame and transmits the generated initialization request frame to bus 100 via frame relay 112 and bus communicator 111. With this, network anomaly handler 118 requests normal ECU 120, which is connected to connector 130 that transmitted the anomaly-related response frame, to initialize software (S1803).

Referring back to Step S1801, if the anomalous state determined by network anomaly determiner 117 is the fourth anomalous state ("ECU incapable of communication is present" in S1801), network anomaly handler 118 generates a vehicle stop request frame and transmits the generated vehicle stop request frame to bus 100 via frame relay 112 and bus communicator 111. With this, network anomaly handler 118 requests vehicle 40 to stop (S1804).

Referring back to Step S1801, if the anomalous state determined by network anomaly determiner 117 is the third anomalous state ("anomalous ECU having connector is connected to bus" in S1801), network anomaly handler 118 generates a communication stop request frame and transmits the generated communication stop request frame to connector 130 (that transmitted the anomaly-related response frame) via frame relay 112 and bus communicator 111. With this, network anomaly handler 118 requests connector 130, which transmitted the anomaly-related response frame, to stop communication with anomalous ECU 120 having the one-to-one connection with this connector 130 (S1805).

After Steps S1802, S1803, S1804, and S1805 described above, network anomaly handler 118 notifies vehicle analysis server 20 about the anomalous state determined by network anomaly determiner 117 (S1806).

[14. Advantageous Effects]

Network anomaly determiner 117 is capable of appropriately determining the anomalous state of in-vehicle network system 10. For example, if the number of anomalous connectors calculated by network anomaly determiner 117 is "0", this means that connector 130 does not store information indicating that this connector 130 transmitted the anomalous frame to bus 100 even though anomalous frame detector 113 has detected the anomalous frame.

Thus, in this case, network anomaly determiner 117 determines that in-vehicle network system 10 is in the first anomalous state in which "anomalous ECU 120 having no connector 130 is connected to bus 100". If the number of anomalous connectors calculated by network anomaly determiner 117 is not "0", network anomaly determiner 117 determines that in-vehicle network system is in the second anomalous state.

This enables network anomaly handler 118 to appropriately handle the anomalous state of in-vehicle network system 10.

(Other Variations)

Although the anomaly detection device, the anomaly detection system, and the control method according to aspects of the present disclosure have been described based on the embodiment, the present disclosure is not limited to the embodiment. Those skilled in the art will readily appreciate that embodiment arrived at by making various modifications to the above embodiment or embodiments arrived at by selectively combining constituent elements disclosed in the above embodiment without materially departing from the scope of the present disclosure may be included within one or more aspects of the present disclosure.

(1) Embodiment above describes the security measures for the in-vehicle network installed in vehicle 40 that is an automobile, for example. The range of application is not limited to this. Vehicle 40 is not limited to an automobile, and thus the technology may be applied to mobility entities, such as construction equipment, farm equipment, ships, trains, and airplanes. More specifically, the technology is applicable as the security measures for mobility networks and mobility network systems.

(2) Although Embodiment above describes an in-vehicle network as a CAN, this is not intended to be limiting. For example, CAN with flexible data rate (CAN-FD), Ethernet (registered trademark), local interconnect network (LIN), or FlexRay (registered trademark), may be used. Alternatively, any combination of these may be used.

(3) In Embodiment above, the anomalous state of in-vehicle network system 10 is determined based on an anomaly in a data frame related to the speed of the vehicle. However, this is not intended to be liming. For example, anomaly detection may be performed for control of an advanced driver-assistance system, such as a parking assistance system, a lane keeping function, or a collision avoidance function.

(4) In Embodiment above, whether in-vehicle network system 10 has an anomaly related to security is determined. However, a failure of ECU 120 or connector 130 may be detected as an anomaly.

(5) In Embodiment above, IDS ECU 110 stores the number of detected anomalous frames, the number of anomalous connectors, the number of received anomaly-related response frames, and the total number of connectors. However, these numbers may be stored into a nonvolatile memory. Whenever an ignition of vehicle 40 is turned on, content stored in the nonvolatile memory may be reset.

(6) In Embodiment above, IDS ECU 110 compares the current total number of connectors with the normal total number of connectors. However, instead of using the past total number of connectors as the normal total number of connectors, data previously stored in IDS ECU 110 prior to shipment of vehicle 40 may be used.

(7) Although IDS ECU 110 notifies vehicle analysis server 20 about the anomalous state via IVI ECU 120e in Embodiment above, this is not intended to be limiting. For example, IDS ECU 110 may notify vehicle analysis server 20 about the anomalous state via external network 30 directly connected to IDS ECU 110, without involving IVI ECU 120e.

(8) Although the determined anomalous state is notified to vehicle analysis server 20 and the driver in Embodiment above, this is not intended to be limiting. For example, ECU 120 such as IVI ECU 120e may be notified about the anomalous state. If vehicle 40 supports vehicle-to-vehicle communication or road-to-vehicle communication, for example, the anomalous state may be notified to another vehicle or infrastructure equipment, such as a roadside unit.

Thus, the anomalous state can be notified to a vehicle near the present vehicle and a device owned by a passerby. This can prevent an accident.

(9) Although the determined anomalous state is notified to vehicle analysis server 20 and the driver in Embodiment above, the determined anomalous state may be stored as a log into a device included in in-vehicle network system 10. If the anomalous state is stored as a log, the automobile dealer may read the log externally via diagnostic port 120*a* to understand details of the anomaly. Alternatively, the log may be transmitted periodically to vehicle analysis server 20.

(10) When the anomalous state is determined in Embodiment above, the handling process is selected from among the following four: (a) requesting to display a message urging the drive to safely stop the vehicle; (b) requesting ECU 120 to initialize the software; (c) requesting vehicle 40 to stop; and (d) requesting to stop communication with ECU 120. However, the handling processes are not limited to these four. For example, other handling processes may include: (e) requesting an emergency stop of the engine; (f) requesting activation of an emergency brake system; (g) requesting to sound an alert or activate warning light; (h) requesting to update the software of ECU 120; and (i) requesting to switch to a manual driving mode. Alternatively, any combination of these processes may be selected. This enables safer handling to be executed.

(11) When the anomalous state is determined in Embodiment above, the handling process is selected from among the following four: (a) requesting to display a message urging the drive to safely stop the vehicle; (b) requesting ECU 120 to initialize the software; (c) requesting vehicle 40 to stop; and (d) requesting to stop communication with ECU 120. However, the handling process may be selected according to the characteristics of ECU 120 determined to be anomalous. For example, suppose that an air-conditioning control ECU is determined to have been taken over. In this case, disconnection of the air-conditioning control ECU from bus 100 has less concern for security. Thus, instead of the handling process of requesting to display the message urging the drive to safely stop the vehicle, a handling process of disconnecting the air-conditioning control ECU from bus 100 may be performed. This enables safer handling to be executed.

(12) In Embodiment above, the number of responses from connector 130 for each anomalous data frame is used as the number of received anomaly-related response frames to determine the anomalous state. However, instead of storing the number of received anomaly-related response frames into connector response storage 116, the number of anomalous-frame transmissions stored in connector 130 may be stored into an anomaly-related response frame and this frame may be notified to network anomaly determiner 117.

(13) It should also be noted that a part or all of the constituent elements in the device according to the above-described embodiment may be implemented into a single Large Scale Integration (LSI). The system LSI is a super multi-function LSI that is a single chip into which a plurality of constituent elements are integrated. More specifically, the system LSI is a computer system including a microprocessor, a ROM, a RAM, and the like. The RAM holds a computer program. The microprocessor operates according to the computer program, thereby causing the system LSI to execute their functions. Each of the constituent elements included in the above-described device may be integrated separately, or a part or all of them may be integrated into a single chip. Further, when development of a semiconductor technology or another derived technology provides a circuit integration technology which replaces LSI, as a matter of course, functional blocks may be integrated by using this technology. Adaption of biotechnology, for example, is a possibility.

(14) It should also be noted that a part or all of the constituent elements included in the above-described device may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance. The system LSI is described here, but the integrated circuit may also be referred to as an integrated circuit (IC), an LSI, a super LSI or an ultra LSI depending on the degree of integration. Moreover, the circuit integration technique is not limited to LSI, and may be realized by a dedicated circuit or a general purpose processor. After manufacturing of the LSI, a field programmable gate array (FPGA) or a reconfigurable processor which is reconfigurable in connection or settings of circuit cells inside the LSI may be used.

(15) An aspect of the present disclosure may be a program (computer program) executed by a computer to perform the control method used by the anomaly detection device, or digital signals forming the computer program. An aspect of the present disclosure may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-Ray® Disc), and a semiconductor memory. An aspect of the present disclosure may be the digital signals recorded on the recording medium. An aspect of the present disclosure may be implemented by transmitting the computer program or the digital signals via an electric communication line, a wired or wireless communication line, a network represented by the Internet, data broadcasting, and the like. An aspect of the present disclosure may be a computer system including a microprocessor and a memory. The memory stores the computer program and the microprocessor operates according to the computer program. It is also possible that the program or the digital signals may be recorded onto the recording medium to be transferred, or may be transmitted via a network or the like, so that the program or the digital signals can be executed by a different independent computer system.

(16) The scope of the present disclosure includes any combinations of the constituent elements and functions described in the above embodiment and variations.

INDUSTRIAL APPLICABILITY

The anomaly detection device according to the present disclosure is useful for an IDS ECU included in an in-vehicle network system, for example.

What is claimed is:

1. An anomaly detection device capable of communicating, via a network of a network system installed in a mobility entity, with a communication device establishing a one-to-one connection with an electronic control device that controls the mobility entity, the communication device comprising one or more communication devices, the electronic control device comprising one or more electronic control devices, the anomaly detection device comprising:
- an anomalous frame detector that detects an anomalous frame, the anomalous frame being an anomalous data frame transmitted from the electronic control device to the network via the communication device;
- a communicator that transmits an anomaly-related request frame to the communication device that is a transmitter of the anomalous frame detected, the anomaly-related request frame requesting a response from the communication device, and that receives an anomaly-related response frame from the communication device, the anomaly-related response frame indicating the transmitter of the anomalous frame and being generated by the communication device in response to the anomaly-related request frame;
- a network anomaly determiner that calculates, based on the anomaly-related response frame received, a total number of anomalous communication devices indicating a total number of communication devices each of which has transmitted the anomaly-related response frame among the one or more communication devices, and determines that the network system is in a first anomalous state when the total number of anomalous communication devices is 0 and that the network system is in a second anomalous state when the total number of anomalous communication devices is not 0; and
- a network anomaly handler that handles the first anomalous state when the network anomaly determiner determines that the network system is in the first anomalous state, and handles the second anomalous state when the network anomaly determiner determines that the network system is in the second anomalous state.

2. The anomaly detection device according to claim 1, wherein when the network anomaly determiner determines that the network system is in the second anomalous state, the communicator further transmits a state request frame to request a response from each of the one or more communication devices connected to the network and receives a state response frame as a response to the state request frame, from each of the one or more communication devices, and
when determining that the network system is in the second anomalous state, the network anomaly determiner further compares a total number of state response frames received with a total number of normal communication devices previously stored to indicate a total number of communication devices that are normal among the one or more communication devices, and determines that the network system is in: a third anomalous state when the total number of state response frames received is more than the total number of normal communication devices; a fourth anomalous state when the total number of state response frames received is less than the total number of normal communication devices; and a fifth anomalous state when the total number of state response frames received is equal to the total number of normal communication devices.

3. The anomaly detection device according to claim 2, wherein the anomalous frame detector further counts a total number of the detected anomalous frames for each data frame type,
the communicator further counts a total number of the received anomaly-related response frames for each data frame type and
when determining that the network system is in the fifth anomalous state, the network anomaly determiner further determines that the network system is in: the first anomalous state when the total number of the received anomaly-related response frames is less than the total number of the detected anomalous frames; and in a sixth anomalous state when the total number of received anomaly-related response frames is more than or equal to the total number of the detected anomalous frames.

4. The anomaly detection device according to claim 1, wherein the anomalous frame detector further counts a total number of the detected anomalous frame for each data frame type, as a total number of the detected anomalous frames,
the communicator further counts a total number of the received anomaly-related response frames for each data frame type and
when determining that the network system is in the second anomalous state, the network anomaly determiner further determines that the network system is: in the first anomalous state when the total number of received anomaly-related response frames is less than the total number of the detected anomalous frames; and in a seventh anomalous state when the total number of the received anomaly-related response frames is more than or equal to the total number of the detected anomalous frames.

5. The anomaly detection device according to claim 4, wherein when the network anomaly determiner determines that the network system is in the seventh anomalous state, the communicator further transmits a state request frame to request a response from each of the one or more communication devices connected to the network and receives a state response frame as a response to the state request frame, from each of the one or more communication devices, and
when determining that the network system is in the seventh anomalous state, the network anomaly determiner further compares a total number of state response frames received with a total number of normal communication devices previously stored to indicate a total number of communication devices that are normal among the one or more communication devices, and determines that the network system is: in a third anomalous state when the total number of state response frames received is more than the total number of normal communication devices; in a fourth anomalous state when the total number of state response frames received is less than the total number of normal communication devices; and in a sixth anomalous state when the total number of state response frames received is equal to the total number of normal communication devices.

6. The anomaly detection device according to claim 1, wherein when the network anomaly determiner determines that the network system is in the first anomalous state, the network anomaly handler transmits, to the network, a display request frame to request to display a message urging a driver of the mobility entity to safely stop the mobility entity.

7. The anomaly detection device according to claim 2, wherein when the network anomaly determiner determines that the network system is in the third anomalous state, the network anomaly handler transmits, to the network, a communication stop request frame to request the communication device that has transmitted the anomaly-related response frame, to stop communication with the electronic control device connected to the communication device.

8. The anomaly detection device according to claim 2, wherein when the network anomaly determiner determines that the network system is in the fourth anomalous state, the network anomaly handler transmits, to the network, a mobility-entity stop request frame to request the mobility entity to stop.

9. The anomaly detection device according to claim 3, wherein when the network anomaly determiner determines that the network system is in the sixth anomalous state, the network anomaly handler transmits, to the network, an initialization request frame to request the electronic control device connected to the communication device to initialize software, the electronic control device being connected to the communication device that has transmitted the anomaly-related response frame.

10. The anomaly detection device according to claim 2, wherein whenever the anomaly detection device is started or whenever a predetermined period of time has elapsed after a start of the anomaly detection device, the communicator further transmits the state request frame to each of the one or more communication devices connected to the network and updates the total number of normal communication devices on the basis of the total number of state response frames received from at least one of the one or more communication devices connected to the network.

11. An anomaly detection system that detects an anomaly caused in a network system installed in a mobility entity, the anomaly detection system comprising:
   a network that is installed in the mobility entity;
   an electronic control device that controls the mobility entity;
   a communication device that establishes a one-to-one connection with the electronic control device; and
   an anomaly detection device that is capable of communicating with the communication device via the network,
   the communication device comprising one or more communication devices, and the electronic control device comprising one or more electronic control devices,
   wherein the anomaly detection device includes:
   an anomalous frame detector that detects an anomalous frame, the anomalous frame being an anomalous data frame transmitted from the electronic control device to the network via the communication device;
   a first communicator that transmits an anomaly-related request frame including anomalous frame information about the anomalous frame to the communication device that is a transmitter of the anomalous frame detected, the anomaly-related request frame requesting a response from the communication device, and that receives an anomaly-related response frame from the communication device, the anomaly-related response frame indicating the transmitter of the anomalous frame;
   a network anomaly determiner that calculates, based on the anomaly-related response frame received, a total number of anomalous communication devices indicating a total number of communication devices each of which has transmitted the anomaly-related response frame among the one or more communication devices, and determines that the network system is in a first anomalous state when the total number of anomalous communication devices is 0 and that the network system is in a second anomalous state when the total number of anomalous communication devices is not 0; and
   a network anomaly handler that handles the first anomalous state when the network anomaly determiner determines that the network system is in the first anomalous state, and handles the second anomalous state when the network anomaly determiner determines that the network system is in the second anomalous state, and
   the communication device includes:
   a second communicator that receives the anomaly-related response frame from the anomaly detection device, transmits the anomaly-related response frame to the anomaly detection device, and transmits, to the network, a data frame transmitted from the electronic control device connected to the communication device;
   a storage that stores transmission frame information about the data frame transmitted from the second communicator to the network; and
   a generator that compares the anomalous frame information with the transmission frame information on the basis of the anomaly-related request frame received, and generates the anomaly-related response frame when the anomalous frame information matches the transmission frame information.

12. A control method used for controlling an anomaly detection device that is capable of communicating, via a network of a network system installed in a mobility entity, with a communication device establishing a one-to-one connection with an electronic control device that controls the mobility entity, the communication device comprising one or more communication devices, the electronic control device comprising one or more electronic control devices, the control method comprising:
   detecting an anomalous frame, the anomalous frame being an anomalous data frame transmitted from the electronic control device to the network via the communication device;
   transmitting an anomaly-related request frame to the communication device that is a transmitter of the anomalous frame detected, the anomaly-related request frame requesting a response from the communication device;
   receiving an anomaly-related response frame from the communication device, the anomaly-related response frame indicating the transmitter of the anomalous frame and being generated by the communication device in response to the anomaly-related request frame;
   calculating, based on the anomaly-related response frame received, a total number of anomalous communication devices indicating a total number of communication devices each of which has transmitted the anomaly-related response frame among the one or more communication devices;
   determining that the network system is in a first anomalous state when the total number of anomalous communication devices is 0 and that the network system is in a second anomalous state when the total number of anomalous communication devices is not 0; and
   handling the first anomalous state when the network anomaly determiner determines that the network system is in the first anomalous state, and handling the second anomalous state when the network anomaly determiner determines that the network system is in the second anomalous state.

\* \* \* \* \*